(12) United States Patent
Feng et al.

(10) Patent No.: US 12,591,041 B2
(45) Date of Patent: Mar. 31, 2026

(54) SYSTEM AND METHOD FOR ROBOTIC INSPECTION

(71) Applicant: New York University, New York, NY (US)

(72) Inventors: Chen Feng, New York, NY (US); Semiha Ergan, New York, NY (US); Bilal Sher, New York, NY (US); Xuchu Xu, New York, NY (US); Guanbo Chen, New York, NY (US); Talha Javed, New York, NY (US); Sruti Madhusudhan, New York, NY (US); Siddharth Mahesh, New York, NY (US); Aravindan Vasudevan, New York, NY (US); Daniel Lu, New York, NY (US); Beyza Kiper, New York, NY (US)

(73) Assignee: New York University, New York, NY (US)

( * ) Notice: Subject to any disclaimer, the term of this patent is extended or adjusted under 35 U.S.C. 154(b) by 182 days.

(21) Appl. No.: 18/453,233

(22) Filed: Aug. 21, 2023

(65) Prior Publication Data

US 2024/0134007 A1 Apr. 25, 2024

Related U.S. Application Data

(60) Provisional application No. 63/399,650, filed on Aug. 19, 2022.

(51) Int. Cl.

| | |
|---|---|
| *G01S 7/41* | (2006.01) |
| *G01S 13/88* | (2006.01) |
| *G06T 7/00* | (2017.01) |

(52) U.S. Cl.
CPC .............. *G01S 7/412* (2013.01); *G01S 7/417* (2013.01); *G01S 13/885* (2013.01);
(Continued)

(58) Field of Classification Search
CPC ........ G01S 7/412; G01S 7/417; G01S 13/885; G01S 13/0209; G01S 7/411;
(Continued)

(56) References Cited

U.S. PATENT DOCUMENTS

| | | | |
|---|---|---|---|
| 10,175,350 B1 * | 1/2019 | Tsokos | ..................... G01V 3/12 |
| 11,892,746 B1 * | 2/2024 | Mazed | ..................... G02F 1/212 |

(Continued)

FOREIGN PATENT DOCUMENTS

| | | | |
|---|---|---|---|
| CN | 109782274 A | * | 5/2019 |

OTHER PUBLICATIONS

Wallace Wai-Lok Lai, et al., "Spectral absorption of spatial and temporal ground penetrating radar signals by water in construction materials," NDT & E International, vol. 67, 2014, pp. 55-63, ISSN 0963-8695, https://doi.org/10.1016/j.ndteint.2014.06.009. ( Year: 2014).*

(Continued)

*Primary Examiner* — William Kelleher
*Assistant Examiner* — Noah Yi Min Zhu
(74) *Attorney, Agent, or Firm* — Hodgson Russ LLP

(57) ABSTRACT

An inspection system includes a ground penetrating radar (GPR) sensor configured to provide at least one probe signal to a portion of a structure and to receive at least one return signal resulting from the corresponding at least one probe signal. A processor is programmed to: receive the at least one return signal as scan data from the GPR sensor; generate maximum amplitude trace normalized data based on the scan data; generate temporal signal gain data based on the scan data; generate a power spectral density image for each of the scan data, the maximum amplitude trace normalized data, and the temporal signal gain data; and analyze, using a machine learning processor, the power spectral density images to identify an anomaly of interest, wherein the (Continued)

10

20

32 machine learning processor is trained to detect an anomaly of interest based on a training set of power spectral density images.

19 Claims, 17 Drawing Sheets

(52) U.S. Cl.
CPC .. *G06T 7/0002* (2013.01); *G06T 2207/10028* (2013.01); *G06T 2207/20081* (2013.01); *G06T 2207/20084* (2013.01)

(58) Field of Classification Search
CPC ......... G06T 7/0002; G06T 2207/10028; G06T 2207/20081; G06T 2207/20084
See application file for complete search history.

(56) References Cited

U.S. PATENT DOCUMENTS

| | | | | |
|---|---|---|---|---|
| 2016/0259045 | A1* | 9/2016 | Huston | H01Q 13/085 |
| 2019/0154826 | A1* | 5/2019 | Huston | H01Q 13/085 |
| 2023/0243956 | A1* | 8/2023 | Agarwal | G01S 13/86 |
| | | | | 342/22 |
| 2025/0014161 | A1* | 1/2025 | Rakha | G06V 20/176 |
| 2025/0044412 | A1* | 2/2025 | Yang | G01S 13/885 |

OTHER PUBLICATIONS

Jun Zhang, et al., "Automatic detection of moisture damages in asphalt pavements from GPR data with deep CNN and IRS method," Automation in Construction, vol. 113, 2020, 103119, ISSN 0926-5805, https://doi.org/10.1016/j.autcon.2020.103119. (Year: 2020).*

Yishun Li, et al., "Deep learning-based pavement subsurface distress detection via ground penetrating radar data," Automation in Construction, vol. 142, 2022, 104516, ISSN 0926-5805, https://doi.org/10.1016/j.autcon.2022.104516. (Year: 2022).*

J. Wang, et al., "GPRI2Net: A Deep-Neural-Network-Based Ground Penetrating Radar Data Inversion and Object Identification Framework for Consecutive and Long Survey Lines," in IEEE Transactions on Geoscience and Remote Sensing, vol. 60, pp. 1-20, 2022, Art No. 5106320, doi: 10.1109/TGRS.2021.3111445. (Year: 2022).*

J. Feng, L. Yang, E. Hoxha and J. Xiao, "Improving 3D Metric GPR Imaging Using Automated Data Collection and Learning-Based Processing," in IEEE Sensors Journal, vol. 23, No. 5, pp. 4527-4539, 1 Mar. 1, 2023, doi: 10.1109/JSEN.2022.3164707. (Year: 2023).*

P. Kaur, K. J. Dana, F. A. Romero and N. Gucunski, "Automated GPR Rebar Analysis for Robotic Bridge Deck Evaluation," in IEEE Transactions on Cybernetics, vol. 46, No. 10, pp. 2265-2276, Oct. 2016, doi: 10.1109/TCYB.2015.2474747. (Year: 2016).*

X. Qiao, F. Yang and X. Xu, "The prediction method of soil moisture content based on multiple regression and RBF neural network," Proceedings of the 15th International Conference on Ground Penetrating Radar, Brussels, Belgium, 2014, pp. 140-143, doi: 10.1109/ICGPR.2014.6970402. (Year: 2014).*

* cited by examiner

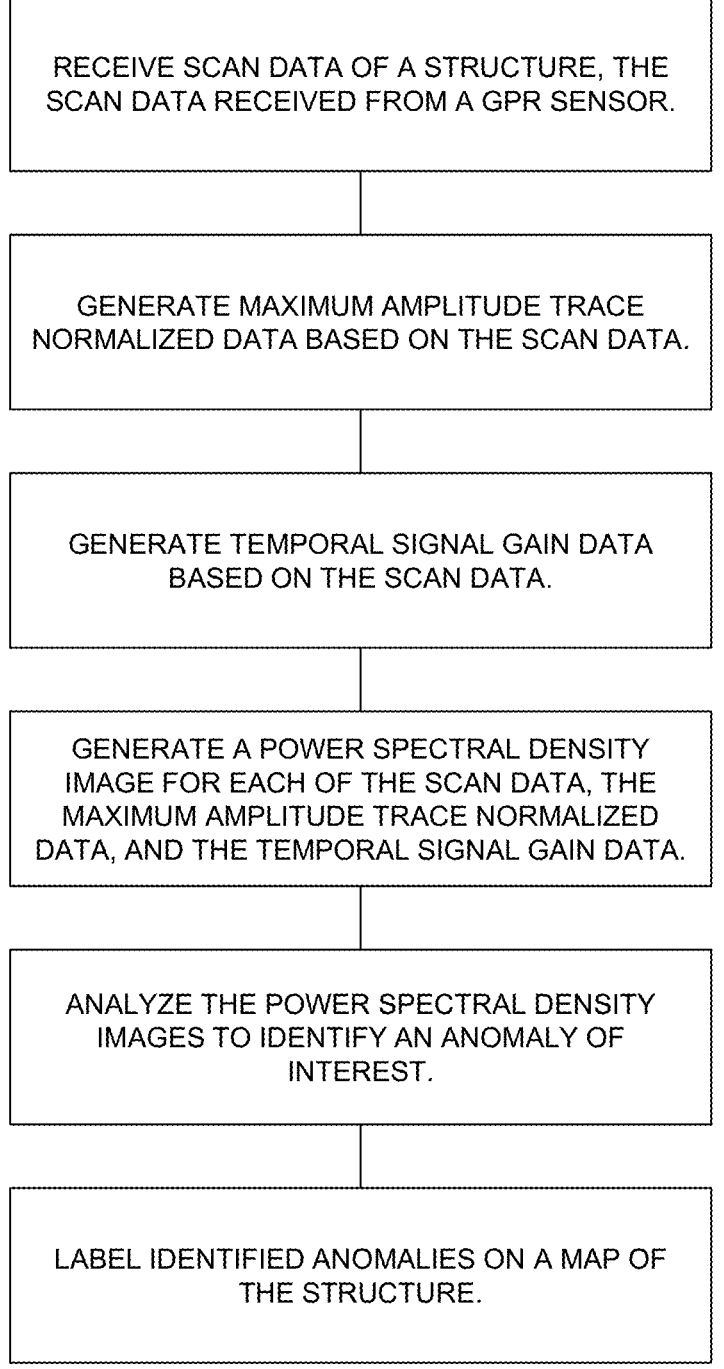

RECEIVE SCAN DATA OF A STRUCTURE, THE SCAN DATA RECEIVED FROM A GPR SENSOR.

GENERATE MAXIMUM AMPLITUDE TRACE NORMALIZED DATA BASED ON THE SCAN DATA.

GENERATE TEMPORAL SIGNAL GAIN DATA BASED ON THE SCAN DATA.

GENERATE A POWER SPECTRAL DENSITY IMAGE FOR EACH OF THE SCAN DATA, THE MAXIMUM AMPLITUDE TRACE NORMALIZED DATA, AND THE TEMPORAL SIGNAL GAIN DATA.

ANALYZE THE POWER SPECTRAL DENSITY IMAGES TO IDENTIFY AN ANOMALY OF INTEREST.

LABEL IDENTIFIED ANOMALIES ON A MAP OF THE STRUCTURE.

Fig. 2

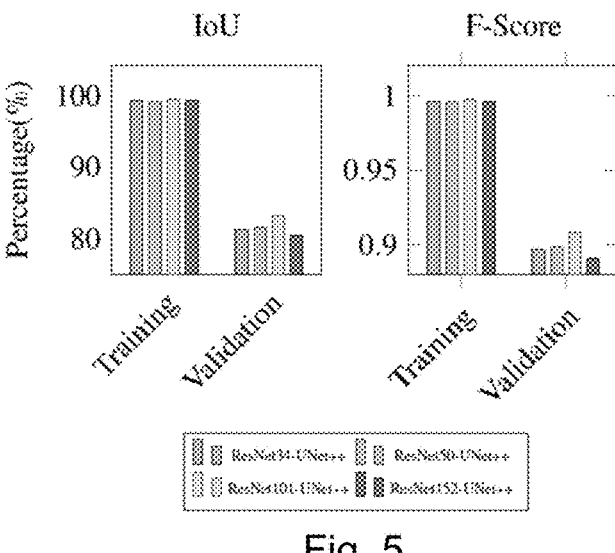
Fig. 5
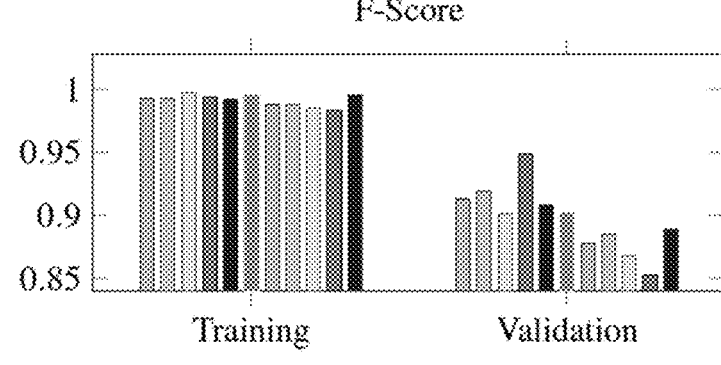
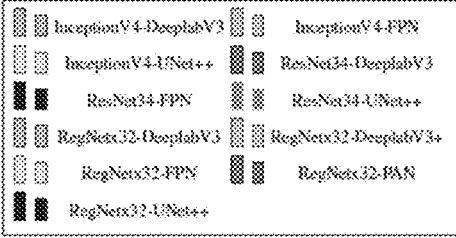
Fig. 6

Errors in the X direction

Errors in the Y direction (a)

SYSTEM AND METHOD FOR ROBOTIC INSPECTION

CROSS-REFERENCE TO RELATED APPLICATIONS

This application claims priority to U.S. Provisional Application No. 63/399,650, filed on Aug. 19, 2022, the disclosure of which is incorporated herein by reference.

STATEMENT REGARDING FEDERALLY SPONSORED RESEARCH

This invention was made with government support under grant nos. CNS-2228568 and TI-2232494 awarded by the National Science Foundation. The government has certain rights in the invention.

FIELD OF THE DISCLOSURE

The present disclosure relates to building inspection, and more particularly, building envelope inspection using radar sensors.

BACKGROUND OF THE DISCLOSURE

Building envelope inspections are necessary to maintain a building's energy efficiency and structural safety, but inspections are expensive, time-consuming, and dangerous to inspectors. Roof moisture scans are essential for maintaining the structural integrity of buildings by identifying moisture damage to the roof. Traditional methods such as visual inspection, infrared thermography, nuclear moisture gauges, and capacitance meters have limitations that can affect the accuracy and reliability of results. There is a need for more effective, less invasive techniques for inspecting building envelopes.

BRIEF SUMMARY OF THE DISCLOSURE

In an aspect, the present disclosure may be embodied as an inspection system. The inspection system includes a ground penetrating radar (GPR) sensor configured to provide at least one probe signal to a portion of a structure and to receive at least one return signal resulting from the corresponding at least one probe signal. In some embodiments, the GPR sensor is configured to provide two or more probe signals and to receive a corresponding two or more return signals. A processor is in electronic communication with the GPR sensor. The processor is programmed to receive the at least one return signal (or two or more return signals) and combine two or more return signals as scan data from the GPR sensor; generate maximum amplitude trace normalized data based on the scan data; generate temporal signal gain data based on the scan data; generate a power spectral density image for each of the scan data, the maximum amplitude trace normalized data, and the temporal signal gain data. The processor is programmed to analyze, using a machine learning processor, the power spectral density images to identify an anomaly of interest (e.g., moisture), wherein the machine learning processor is trained to detect an anomaly of interest based on a training set of power spectral density images.

In another aspect, a method of inspecting a structure is provided. The method includes receiving scan data of a structure from a GPR sensor; generating maximum amplitude trace normalized data based on the scan data; generating temporal signal gain data based on the scan data; generating a power spectral density image for each of the scan data, the maximum amplitude trace normalized data, and the temporal signal gain data; and analyzing, using a machine learning processor, the power spectral density images to identify an anomaly of interest, wherein the machine learning processor is trained to detect an anomaly of interest (e.g., moisture) based on a training set of power spectral density images.

DESCRIPTION OF THE DRAWINGS

For a fuller understanding of the nature and objects of the disclosure, reference should be made to the following detailed description taken in conjunction with the accompanying drawings.

FIG. 2: A chart depicting a method for inspecting a structure according to another embodiment of the present disclosure.

FIG. 5: Effect of encoder depth on model accuracy.

FIG. 6: Effect of decoder type on model accuracy.

Figure 22:
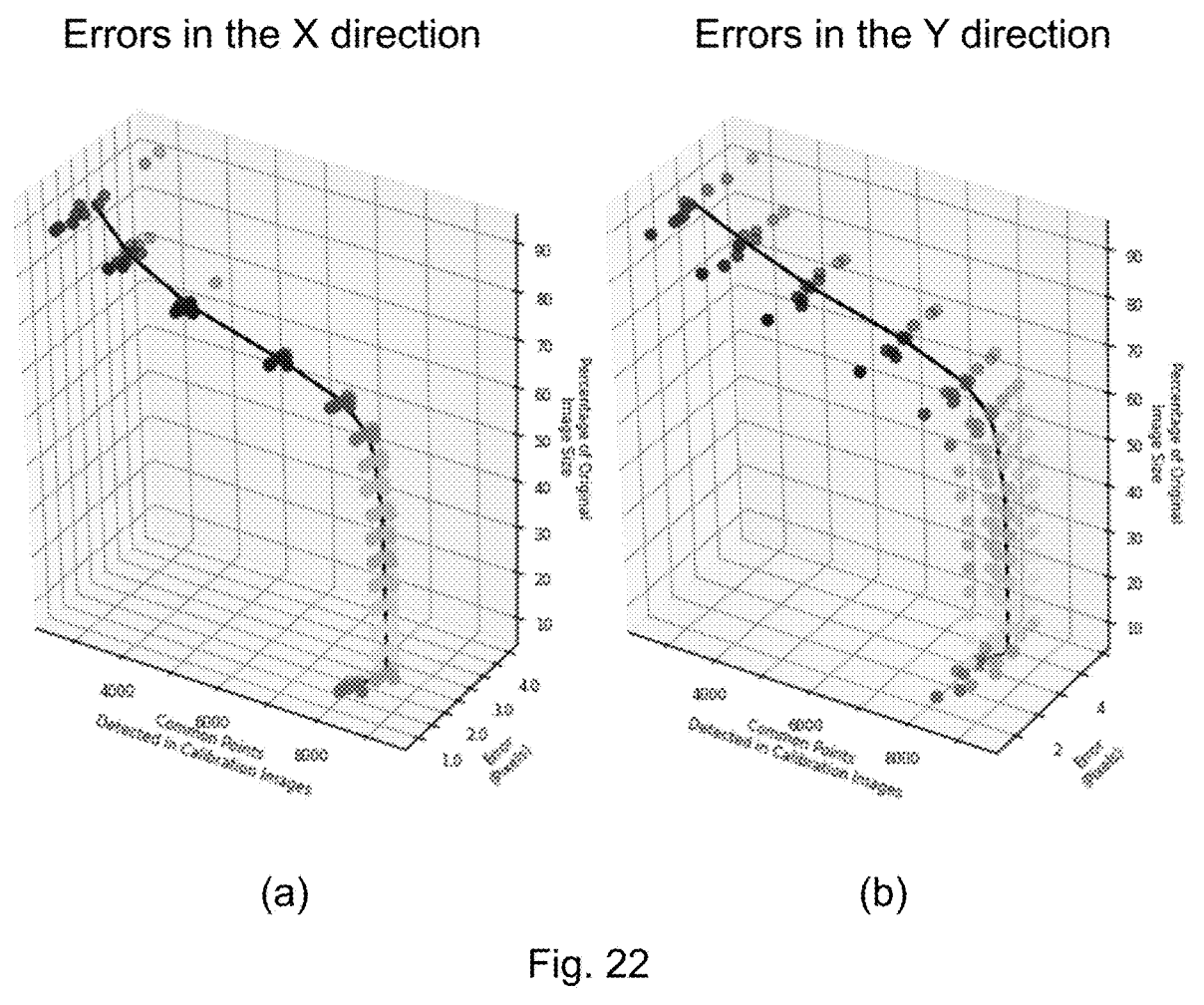

FIG. 22: Image Registration Error for homographies between RGB and Thermal images calculated at various RGB image sizes. (a) Image Registration Errors in the X direction; (b) Image Registration Errors in the Y direction.

DETAILED DESCRIPTION OF THE DISCLOSURE

The present disclosure utilizes ground-penetrating radar (GPR) data on buildings (e.g., roofs, walls, floors, etc. GPR can be used to image the subsurface, such as, for example, the materials under the roofs. In this way, GPR can be used to detect anomalies that building owners should be aware of—for example, moisture buildup or leakage.

GPR uses radar to collect data from the subsurface. Each scan contains data regarding the amplitude of the wave and the time taken for the wave to be reflected back to the scanner. Each reading is recorded as a trace along the x axis and the two-way-time is recorded along the y axis, with the values representing the amplitude of the wave. A collection of readings makes up a scan. The scans may be visualized in a 2D plot, and anomalies may be identified within the plots, even despite the presence of occlusions. Identification of anomalies (e.g., the presence of moisture) can be automated using machine learning (e.g., deep learning, etc.)

Figures 1A, 1B, 1C:
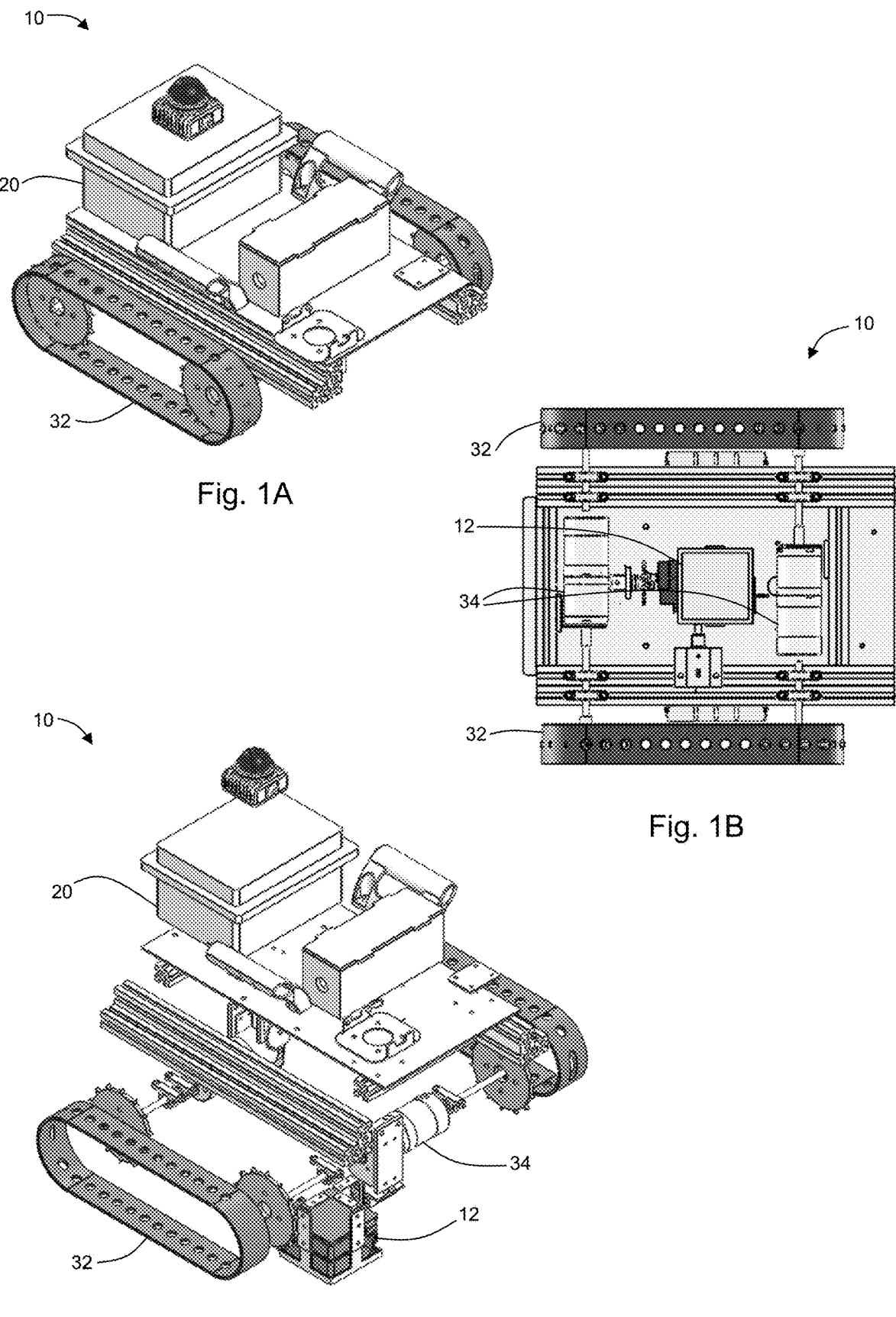
FIG. 1A: An perspective view illustration of an inspection system according to an embodiment of the present disclosure.
FIG. 1B: A bottom view of the inspection system of FIG. 1A.
FIG. 1C: An exploded perspective view of the inspection system of FIGS. 1A and 1C.
Figure 3:
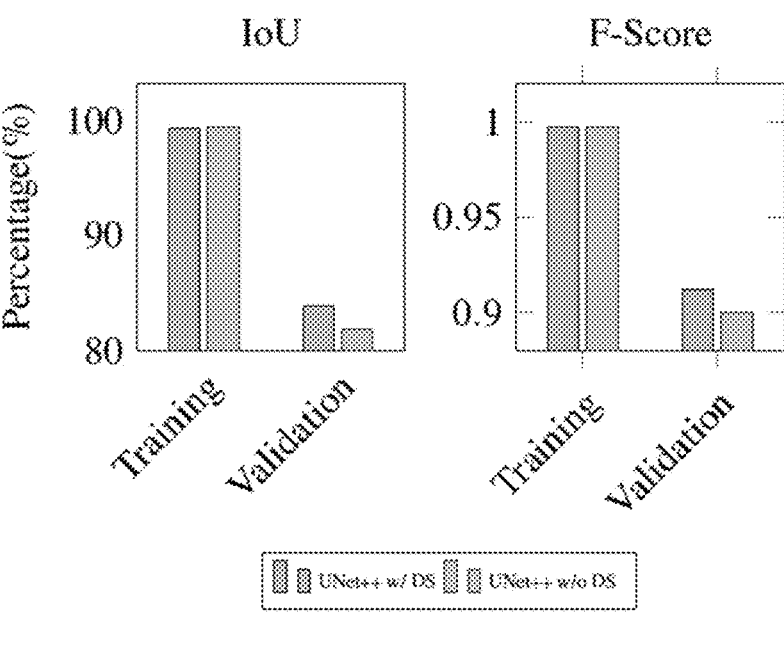
FIG. 3: Effect of deep supervision on model accuracy.
Figure 4:
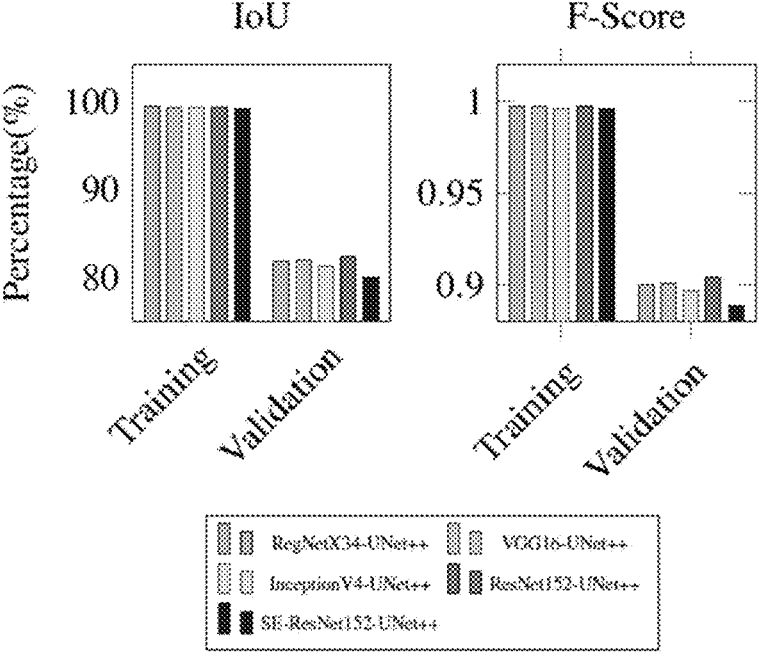
FIG. 4: Effect of encoder type on model accuracy.
Figure 7:
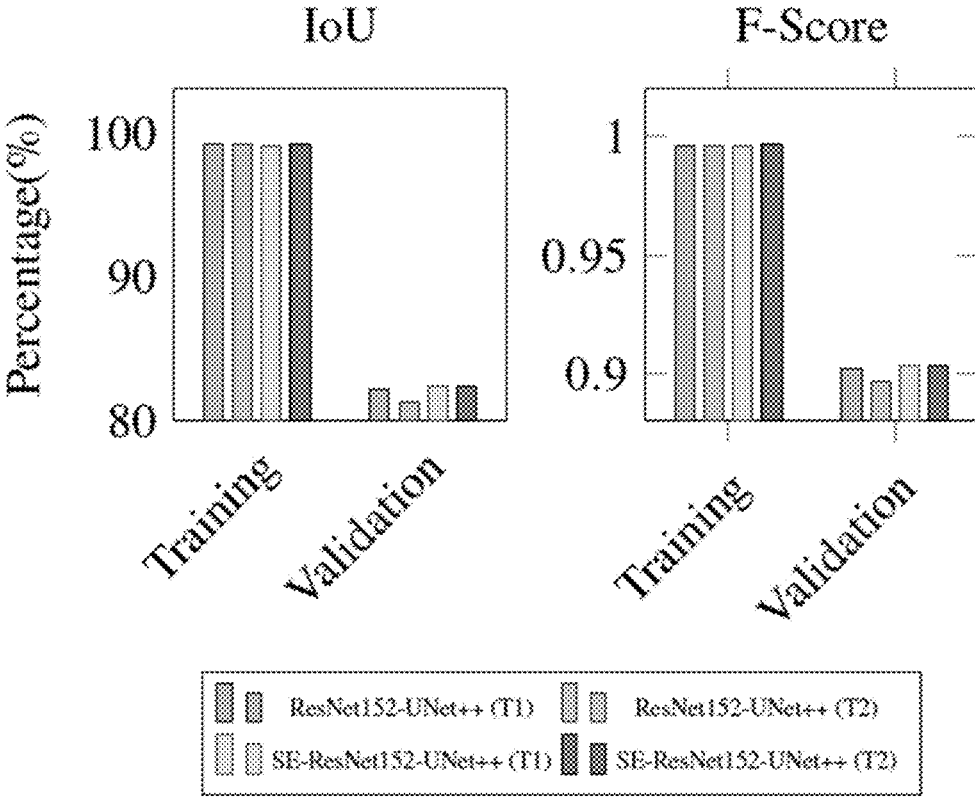
FIG. 7: Effect of decoder depth on model accuracy.

With reference to FIGS. 1A-1C, in a first aspect, the present disclosure may be embodied as an inspection system 10, such as, for example, a building inspection system. An embodiment of such an inspection system includes a radar sensor. The radar sensor may referred to as a ground-penetrating radar (GPR) sensor 12. Although commonly called ground-penetrating radar, such a sensor is not limited to use for ground applications, and the present disclosure is not limited to such applications (e.g., the GPR sensor can be used for other applications such as, for example, building inspection). The GPR sensor is configured to provide at least probe signal (e.g., at least one longwave electromagnetic probe signal) and to receive at least one return signal resulting from the corresponding at least one probe signal. It is noted that the return signal may include more than one reflected signal resulting from the initial probe signal. The probe signal may be a pulsed signal or a continuous signal, such as, for example, a stepped frequency continuous wave (SFCW) signal (further described below) or other signal types known for use in such radar sensors.

The inspection system 10 includes a processor 20 in electronic communication with the GPR sensor 12. The processor is programmed to receive the at least one return signal from the GPR sensor. This at least one return signal is the scan data from the GPR sensor. Where more than one return signal are received, the processor may be configured to combine two or more of the return signals as the scan data. The scan data is produced from, for example, a scan of a structure (e.g., a building). For example, as the GPR sensor is moved over a surface, probe signals are sent and return signals are received at various locations (e.g., spaced apart as the sensor is moved, spaced in time, or otherwise sampled). The return signals may be combined to provide scan data which shows the return signals across the distance traveled by the sensor. In some embodiments, the processor is further programmed to register the return signals (e.g., two or more return signals) into a same coordinate frame. In this way, the scanned structure may be mapped.

The processor is programmed to generate maximum amplitude trace normalized data based on the scan data. Maximum amplitude normalizing is a noise removal technique that is valid on flat/level surfaces or surfaces where the GPR unit is a constant distance from the surface being measured. The largest reflectance in a GPR scan should be seen at the top of the scan when the radar wave first enters the material being scanned. It may be advantageous for the reflectance amplitude to be the same in all traces. Maximum amplitude trace normalization finds the average peak amplitude across all traces and scales each trace such that its maximum amplitude is now the average peak amplitude.

The processor is programmed to generate temporal signal gain data based on the scan data. For example, for linear signal gains, later signals may be enhanced by multiplying the traces with a linearly increasing gain vector that is the same length as the trace. For exponential signal gains, the signal may be enhanced by multiplying the traces with an exponentially increasing gain vector. Other techniques for applying a temporal signal gain may be used.

The processor is programmed to generate a power spectral density (PSD) image for each of: (1) the scan data, (2) the maximum amplitude trace normalized data, and (3) the temporal signal gain data. In some embodiments, the three power spectral density images are concatenated into 2D PSD image. The PSD image may also include the scan data, the maximum amplitude trace normalized data, and the temporal signal gain data. As a result, a GPR scan by the inspection system could be represented as a 6 channel tensor. This 6 channel tensor may then be used as the input to a machine learning processor (further discussed below). The machine learning processor may be a part of the processor or separate from the processor.

The processor utilizes artificial intelligence (AI) to analyze the power spectral density images (e.g., the concatenated power spectral density image) to identify an anomaly of interest. The anomaly of interest may be, for example, moisture. For example, the inspection system may be used to scan a structure (e.g., a roof, a wall, etc.) for the presence of moisture. In some embodiments, the processor (e.g., the AI) component may classify water. In some embodiments, the processor may quantify the moisture content. In some embodiments, the AI is a machine learning processor such as, for example, an artificial neural network (e.g., a convolution neural network, a deep-learning architecture, etc.) The machine learning processor may be trained to detect an anomaly of interest. Embodiments of a machine-learning-based image segmentation processor may provide output as line scans, images, or otherwise.

Movement of the radar sensor may be tracked (for example, as part of a robotic platform) through the use of simultaneous localization and mapping (SLAM). The GPR line scan results may be fused with location data from SLAM sensors. In this way, the processor may be configured to label moisture in a map (e.g., a moisture survey map) generated by a mapping circuit (e.g., SLAM sensor(s)).

The inspection system 10 may further comprise a movement actuator (i.e., a robotic platform 30). The GPR sensor may be affixed to the robotic platform. The robotic platform may be, for example, a wheeled vehicle, a tracked vehicle, an unmanned aircraft system (UAS) (embodiments of which are sometimes referred to as "drones"), a robotic dog, etc. The robotic platform can be broadly considered to be any actuator providing the ability to move the inspection system. The robotic platform is configured to move over a surface of a structure. For example, the inspection system 10 of FIGS. 1A-1C is embodied as a tracked vehicle (i.e., moving via tracks 32). Although wheels (e.g., large rubber wheels) may be useful in some embodiments, the size of such wheels may not allow movement over large obstructions. Tracks using a differential drive mechanism were found to be advantageous in moving over obstructions without damaging components of the system. Tracks also proved beneficial in movement over various types of surfaces (e.g., gravel, sand, glass, etc.) and avoided slippage on low-friction areas. One or more motors 34 may be used to move the system 10 via the tracks 32.

A GPR sensor may include a wheel to measurement a distance traveled by the GPR. In some embodiments, the wheel may be connected to a drivetrain of the robotic platform in order to match the GPR wheel rotation with that of the robotic platform (wheel, track, etc. of the robotic platform).

The processor may be programmed to label a map with the anomaly. For example, the processor may label where moisture was identified. Such a map may be generated using the scan data and the localization and/or mapping data from a mapping circuit (e.g., having a SLAM sensor).

In another embodiment, the present disclosure may be embodied as a method of inspecting a structure. The method may include any of the processor program steps above. For example, the method may include receiving scan data from a radar sensor, the scan data produced from a scan of a structure; generating maximum amplitude trace normalized data based on the scan data; generating temporal signal gain data based on the scan data; determining a power spectral density image for each of the scan data, the maximum amplitude trace normalized data, and the temporal signal gain data; detecting moisture data in the scan data, using a machine learning processor, the moisture data corresponding to the presence of moisture in the scanned structure; and labeling moisture in a map of the structure based on the detected moisture data.

Ground-Penetrating Radar (GPR)-Based Moisture Detection

A GPR works by sending radar frequency electromagnetic radiation into a material. As a radar wave propagates through the material, the dielectric properties of the material attenuate the signal. Changes in dielectric properties of the propagation medium, i.e., from air to concrete, or from dry concrete to wet concrete, result in the radar wave reflecting from that surface. The effect is similar to that seen in the artwork called "7 Standing Panels" by Gerhard Richter. Light both passes through, is absorbed by, and reflects off of the panes of glass. This is because each pane of glass is separated by air and there is a change in the refractive index of materials. This is similar to how radar frequency electromagnetic radiation passes through, is absorbed by, and reflects off of materials due to changes in the dielectric constant of the material. Ground penetrating radar (GPR) is a method of using radar to detect objects that are buried, embedded, or hidden behind another material. GPR sensors capture data by discharging pulses of longwave electromagnetic radiation in GHz to MHz (radar) frequency range and listening for a return signal. The return signals are caused by changes in material properties of the medium being scanned; specifically the relative permittivity or dielectric constant of the material. The equation that governs the strength of the return signal is:

$$R = \frac{\sqrt{\epsilon_1} - \sqrt{\epsilon_2}}{\sqrt{\epsilon_1} + \sqrt{\epsilon_2}}$$

$\epsilon_1$=Dielectric constant of the material the wave is travelling from $\epsilon_2$=Dielectric constant of the material the wave is travelling to What the equation highlights is that the relative difference in dielectric constant between two materials is proportional to the magnitude of reflectance between the two materials. As a radar wave propagates through the material, the dielectric properties of the material attenuate the signal. Changes in dielectric properties of the propagation medium, i.e., from air to concrete, or from dry concrete to wet concrete, result in the radar wave reflecting from that surface. The effect is similar to that seen in the artwork called 7 standing panes by Gerhard Richter. Lights both passes through, is absorbed by, and reflects off of the panes of glass. This is because each pane of glass is separated by air and there is a change in the refractive index of materials. This is similar to how radar frequency electromagnetic radiation passes through, is absorbed by, and reflects off of materials due to changes in the dielectric constant of the material.

The dielectric constant for common non-metallic materials used in building construction is between 2 and 10, while the dielectric constant for water at environmentally observed temperatures is between 90 and 70 and decreases with increasing heat. Many industries utilize GPR to find hidden and buried objects. GPR can be used for detecting pipes and buried utility lines, analyzing the structural makeup of concrete sections, archaeology and forensics work, analyzing the viability and safety of mining operations, detecting unexploded ordinances and much more.

Although there are multiple ways a GPR sensor can send and receive radar signals, the most basic way is by sending a fixed frequency pulse into a medium and listening for reflectance return signal. This is referred to as an impulse GPR because it sends an impulse into the medium. Another way to capture GPR data is to use a stepped frequency continuous wave (SFCW) GPR. This works by sending a continuous signal with a modulated frequency into the medium and listening for the reflectances from various wavelengths. Some studies show that SFCW is the superior configuration for maximizing data capture of smaller, shallow targets—which has an outsized benefit in the structural and buildings analysis use case of GPR. Measurements can either be taken at a fixed time interval or at a fixed distance interval. Both methods have their own advantages and disadvantages.

In an experimental embodiment, an inspection system included a Proceq GP8800 SFCW handheld GPR sensor. The device manufacturer, Screening Eagle, has designed this device to record data at a fixed distance interval of 1 cm. This can be changed through adding custom hardware that can either record data at a fixed time interval or at a different distance interval. This handheld GPR unit is designed to be deployed generally flush against the medium it is recording the data of. The default setting was used during experimentation, but the scope of the present disclosure is not limited to such default settings.

Moisture Detection Using GPR

GPR does not detect materials, instead it detects the boundaries between materials of different dielectric constants. Because water has such as high dielectric constant, adding excess moisture to materials has a measurable effect on the average dielectric constant of a material. This is what allows GPR sensors to detect elevated levels of moisture within scanned mediums. Researchers have carried out tests using GPR to find areas of moisture within building envelopes and other structures. GPR is a proven way of detecting moisture hidden within building roofs and façades. Although its widespread adoption could benefit the roof moisture survey industry, it is likely that the difficulty of interpreting the data has been the largest roadblock to its widespread uptake.

Industry Standard Moisture Detection Methods

Currently the industry uses a number of non-destructive testing techniques to detect trapped moisture within roofs and façades. Most techniques are geared towards finding moisture within roofs. Façade analysis is expensive due to the cost of access and some technologies are physically unable to assess vertical surfaces.

One of the most commonly used building envelope moisture assessment techniques is infrared scanning, also known as infrared thermography or IRT. Infrared scanners or infrared cameras are able to record infrared wavelength electromagnetic radiation. Moisture can appear on an infrared scan in a number of ways. Depending on environmental conditions, moist areas of a building envelope may be warmer or colder than the surrounding dry portions of the building envelope. Infrared scanners are relatively easy to use, readings can be seen immediately, and the visual presentation format of the readings makes them intuitive to understand. However, thermal images can easily be misunderstood by an inexperienced reviewer; environmental conditions can easily be confused for moisture or thermal bridging. Solar radiation and reflections from other buildings, people, and objects can also create noise in thermal images. Additionally, because most building materials have an negligible amount of infrared radiation transmission, infrared scans only pick up surface level thermal data. This means that it can be difficult to impossible to detect moisture if it is under unsaturated insulation. Often, the rigid foam insulation that is commonly used on external insulation finishing systems (EIFS) does not saturate well and obscures deep moisture intrusion in roof and façade assemblies.

Although not commonly used, electrical resistance scanning can also be used to provide data on moisture content within a roof. Electrical resistance scanning is done with a pinned moisture meter. When the two pins of the moisture meter come in contact with a surface, the surface completes the circuit and the moisture meter is able to calculate the moisture content of the surface by measuring its resistivity.

Electrical resistance scanners are easy to us and provide immediate readings, but they can only be used to capture single point measurements. Furthermore, for the most accurate readings, a sensor may be calibrated for the material being scanned.

Electrical impedance scanning is widely used to rapidly assess the moisture content within a roof assembly. This method works by creating an electric field between two electrodes and measuring the absolute dielectric constant of the material between the two electrodes. The material between the electrodes act as a capacitor—the more moisture in the material, the weaker the capacitor. This method has issues with detecting moisture at depth. The readings are biased towards surface level moisture and it is not possible to understand the moisture content in the depth axis. The scan penetration depth is generally limited to 1.5 inches, and the most advanced commercially available electrical impedance scanner has a theoretical maximum scan depth of 6 inches.

Electric field vector mapping (EFVM) is currently the only method of pinpointing the location of leaks and breaches within a roof membrane. EFVM can provide immediate results, but this can be heavily dependent on skill of the operator. EFVM has two variants, low voltage EFVM and high voltage EFVM. There are two main ways that low voltage EFVM can be carried out: with a brushed system and with a pole system. The principle that both methods operate on is the same. Low voltage EFVM requires an electrically conductive plane above and beneath a non-conductive waterproofing membrane. A positive charge is induced in the conductive plane above the non-conductive waterproofing layer and the layer below the waterproofing layer is grounded. In areas where there are leaks or breaches in the non-conductive waterproofing layer, a circuit is established between the positively charged upper layer and the grounded bottom layer. The direction of the electric field is defined by electricity traveling from the upper layer, through the breach, and into the bottom layer. This means that the substrate directly below the waterproofing membrane must necessarily be conductive. For low voltage EFVM, the conductive plane above the waterproofing layer is created by wetting the surface membrane—there must be enough water to establish a circuit. High voltage EFVM does not require water. Due to the high voltages involved, it is possible to detect breaches through sparking. High- and low-voltage EFVM are powerful techniques that can be deployed to find breaches in a waterproofing layer, but they cannot be deployed to detect moisture content. Furthermore, any materials (such as insulation, coverboard, etc.) between the top conductive plane and the bottom conductive plane, other than the waterproofing layer, will result in a less than optimal scan. EFVM cannot be deployed on walls, it cannot be deployed to find breaches in metal roofing, and the quality of the analysis is heavily dependent on the operational skill and interpretation ability of the user.

Ground penetrating radar competes most directly with infrared scanning, electrical impedance scanning, and, to an extent, electrical resistance scanning. Unlike infrared scanning, GPR-based moisture scanning can be done at any wind speed and at any time of the day or night. GPR-based scans can detect moisture even if the moisture is not present at the surface. GPR scanning out-competes electrical impedance scanning because GPR has a much deeper depth of penetration than the best commercially available electrical impedance scanner. Furthermore, GPR and IRT are the only methods that can be applied to determine moisture content within vertical surfaces like walls and façades, but GPR is not affected by the presence of exterior insulation. There are a few drawbacks—GPR cannot be used on metallic surfaces and therefore cannot detect the moisture content of materials behind metallic cladding or metal roofing. Furthermore, GPR scans can be very difficult for reviewers to interpret. There is no commercially available system that can provide immediate moisture analysis of GPR scans. Therefore, to generate a moisture survey the location of the GPR may be tracked as a scan is performed. One way to address these shortcomings is to mount the GPR sensor on a robot with SLAM capabilities and analyze the sensor readings with an AI trained to detect moisture and other anomalies in roof and wall assemblies.

Other Work

A number of researchers have tried to incorporate artificial intelligence (AI) and neural networks into the analysis of GPR scans. Some researchers have used AI and GPR to assess moisture content within concrete, soil, and other materials. Kilic and Unluturk analyzed a bridge deck using a simple artificial neural network that analyzed a section of a GPR scan, i.e., a group of multiple consecutive traces, and produced a binary wet-dry classification. Zhang et al took this further and used Resnet and YoloV2 to draw bounding boxes around suspected areas of moisture within a GPR scan. Qiao et al made an early attempt to estimate soil moisture content from GPR scans with a radial basis function neural network. Zheng et al further advanced this by using a CNN connected to a fully connected layer to make a regression analysis of soil moisture content. A number of other authors have used the same CNN+FCL set up to find other object representations within GPR scans. Hou et al implemented a Mask R-CNN to segment hyperbolic signatures of rebar in GPR scans of a bridge deck.

The present disclosure improves the current research landscape in a number of ways. Firstly, this work presents a novel way to simulate moisture in building envelope assemblies. Secondly, this research tests various segmentation models outfitted with a linescan conversion block that can be used to make a determination on whether a portion of the GPR scan is wet or dry. Finally, this research adds 5 additional data channels for analysis when analyzing GPR scans by adding a max-amplitude normalization channel, a time-gain channel, and 3 additional channels that are power spectral density images based on the raw GPR scan channel, the max amplitude normalized channel, and the time-gain channel, respectively.

Methods and Results

Testbed

A novel testbed was created to test various kinds of building assemblies with various simulated moisture contents. The base of the test bed had a $\frac{5}{16}$" thick 4'×8' standard size OSB sheathing board. On various portions of the bed, moisture was simulated by placing a 6.25 in×8.25 in moistened paper towel inside of a sealed plastic bag. Water was added to simulate OSB moisture content above normal. Normal OSB moisture content can vary from location to location across the united states. Documents from the U.S. Forest Service show that OSB moisture content can range from 11.5% to 12.5% in New York City depending on the time of the year. A base moisture content of 11.7% was assumed. This was used in calculating the amount of water already present in the wood in order to determine how much water needed to be added to the paper towels.

$$\gamma_{osb} = \frac{43 \text{lbs}}{3'11.5'' \times 7'11.5'' \times t_{osb}} \cdot 453.592 \frac{g}{\text{lbs}}$$

$$\gamma_{osb} t_{osb} = 4.30 \frac{g}{\text{in}^2}$$

$$m_{wood} = 4.30 \frac{g}{\text{in}^2} \cdot 6.25 \text{in} \cdot 8.25 \text{in} = 221.70 g$$

$$m_{wood_{dry}} = \frac{m_{wood_{wet}}}{(1 + 12.5\%)}$$

$$m_{wood_{wtr}} = m_{wood_{wet}} - m_{wood_{dry}}$$

$$m_{pptl_{dry}} = 13.39 g$$

$$m_{ttl_{dry}} = m_{wood_{dry}} + m_{pptl_{dry}}$$

$$M_{wtr_{reqd}} = m_{ttl_{dry}} (\% MC) - m_{wood_{wtr}}$$

Due to size and spacing requirements on the test kit as well as the range of moisture content required to cause mold growth, the following breakdown in tests was chosen:

| MC % | $m_{wtr_{addl}}(g)$ |
|---|---|
| 11.70% | 0 |
| 18.73% | 14.78 |
| 25.75% | 29.56 |
| 32.77% | 44.34 |
| 39.80% | 59.12 |
| 46.82% | 73.90 |

After the base of the test bed was created, various building materials at different orientations were added to create a dataset of GPR scans. There were 48 different combinations of building material captured. Each configuration produced 6 different scans making it equivalent to 288 different GPR scans conducted with varying moisture content and different superimposed building envelope materials. The building materials superimposed onto the testbed included:

1. $\frac{7}{16}$" OSB sheet
2. 1" Rigid Foam Insulation
3. Timber 2×4 studs
4. Metal 2×4 studs
5. 8"×4"×2" clay masonry wall bricks
6. 4"×16"×8" hollow concrete blocks Thin materials like vapor barriers, air barriers, and waterproofing membranes were not included in the test as they do not affect GPR readings. The test simulated moisture condensing on both exterior and interior sides of a wall assembly, depending on the climate and time of year. Research from other authors confirms that moisture is not evenly distributed throughout a wall or roof assembly, and it is more concentrated at either the interior or exterior side of the assembly. This test was also designed based on research that shows that moisture content at or above 19% will catalyze mold growth. The test bed was simply supported over two tables, and the tables were placed at least 30 cm from the edges of the moisture areas to ensure that the table legs did not affect the GPR readings. Overall, the test bed provided a comprehensive dataset of GPR scans conducted with varying moisture content and different building envelope materials, which can help researchers and practitioners in developing effective moisture control strategies for building assemblies.

Data Analysis

Data was captured by moving the Proceq GPR 8800 unit over the sections of the testbed marked with water. Scans were conducted by moving the unit over the center of the moist areas. These lines were premarked to ensure ease of testing. The GPR records data as the wheel attached to it moves. The GPR sometimes gets caught on surfaces being scanned and as a result there may be discontinuities in the radargram. When the GPR was caught on brick, the test scan was re-performed more slowly. In some cases, the GPR unit was slightly raised to allow it to clear an obstacle such as a slightly protruding brick. The scans were recorded on the Proceq GPR Live app, uploaded to the Proceq servers, and then exported as SEG-Y files from the Proceq servers. SEG-Y files are a standard open source format for exporting GPR data. This data could be 2-dimensional as was the case with this specific GPR recording unit or they could be 3-dimensional as may be the case with larger more powerful units. Different GPR manufacturers have different data exporting methods, but the benefit of using equipment that exports data in a SEG-Y format ease of processing such data in Python through the SEGY-SAK python library. This library is very well supported by the Software Underground community. They routinely perform machine learning and deep learning on GPR acquired datasets. The SEG-Y file is processed with the SEGY-SAK API to extract a numpy array of the raw, unfiltered GPR scan data. Each column in the numpy array represents a trace.

$$G_{i,j} = \begin{bmatrix} t_{r_{1,1}} & \cdots & t_{r_{1,n}} \\ \vdots & \ddots & \vdots \\ t_{r_{m,1}} & \cdots & t_{r_{m,n}} \end{bmatrix} = \begin{bmatrix} T_{r_1} & \cdots & T_{r_n} \end{bmatrix} \tag{1}$$

The data obtained from the GPR was raw radargram data, which was then processed by maximum amplitude normalizing the data. This is a noise removal technique that is valid on flat/level surfaces or surfaces where the GPR unit is a constant distance from the surface being measured. Maximum amplitude trace normalization finds the average peak amplitude across all traces and scales each trace so that its maximum amplitude is now the average peak amplitude.

$$A_p = \frac{1}{n} \sum_{i=1}^{n} \max(T_{r_i}) \tag{2}$$

$$\tilde{G}_{i,j} = \begin{bmatrix} t_{r_{1,1}} \cdot \dfrac{A_p}{\max(T_{r_1})} & \cdots & t_{r_{1,n}} \cdot \dfrac{A_p}{\max(T_{r_n})} \\ \vdots & \ddots & \vdots \\ t_{r_{m,1}} \cdot \dfrac{A_p}{\max(T_{r_1})} & \cdots & t_{r_{m,n}} \cdot \dfrac{A_p}{\max(T_{r_n})} \end{bmatrix} \tag{3}$$

In addition to applying maximum amplitude trace normalization, a temporal signal gain was also applied to the images. There are many ways of applying a temporal signal gain, but the linear and exponential methods were used in the tests below. For linear signal gains, $$Gn_{m \times n}^{l}$$

later signals are enhanced by multiplying the traces with a linearly increasing gain vector that is the same length as the trace. For exponential signal gains, $$Gn_{m \times n}^{e},$$

the signal can be enhanced by multiplying the traces with an exponentially increasing gain vector.

$$Gn_{m \times n}^{l} = C \cdot \begin{bmatrix} 1 & \cdots & 1 \\ \vdots & \ddots & \vdots \\ m & \cdots & m \end{bmatrix} \tag{4}$$

$$\tilde{G}'_{i,j} = G_{i,j} \odot Gn_{m \times n}^{l} \tag{5}$$

$$Gn_{m \times n}^{e} = \begin{bmatrix} 1^c & \cdots & 1^c \\ \vdots & \ddots & \vdots \\ m^c & \cdots & m^c \end{bmatrix} \tag{6}$$

$$\tilde{G}'_{i,j} = G_{i,j} \odot Gn_{m \times n}^{e} \tag{7}$$

This resulted in 3 different GPR scans: the raw data scan $G_{i,j}$, the maximum amplitude trace normalized scan $\tilde{G}_{i,j}$, and the temporal signal gain scan $$\tilde{G}'_{i,j}.$$

These were further enhanced by finding a power spectral density image associated with each scan. The power spectral density image was generated by finding the PSD of each individual trace and then concatenating them into a 2D image.

$$PSD(G_{i,j}, \tilde{G}_{i,j}, \tilde{G}'_{i,j}) = P_{i,j}, \tilde{P}_{i,j}, \tilde{P}'_{i,j} \tag{8}$$

There are other GPR scan normalization techniques that are not applicable to our current scanning data set and would not produce additional usable information. As a result, each GPR scan could be represented as a 6 channel tensor $$I^{(m \times n \times 6)} = \left[ G_{i,j}, \tilde{G}_{i,j}, \tilde{G}'_{i,j}, P_{i,j}, \tilde{P}_{i,j}, \tilde{P}'_{i,j} \right].$$

This 6 channel tensor served as the input to the deep learning network. Data was annotated by denoting sections, i.e., multiple consecutive whole traces, of the radargram as being either moist or dry. The locations of the simulated moisture in the test bed was used as a guide because there were minor changes in the starting or ending position of the GPR scan from run to run. This was used to produce a 2D image mask, $M_{1 \times n}$, with a pixel height of 1 and a width that represented the distance the GPR moved.

Example of GPR Segmentation by Deep Learning

Data augmentation is a technique used to increase the diversity of data in a dataset for training machine learning models. In this study, random horizontal flips and random resizing were used for data augmentation. Horizontal flipping had a 50% chance of occurring while resizing had a 75% chance of occurring. Resizing involved expanding or shrinking the horizontal portions of the scans by up to 40% compared to the original horizontal scan length. After resizing, the binary 0 or 1 representation of the masks would no longer hold, and any mask value above 0 was set to 1.

To ensure that the scans could be easily processed by deep learning segmentation algorithms, the height and width of the batches were fixed to 672 and 128, respectively. Scans were top-padded by copying the first row of the input tensor. If the scan width was less than 128, scans were left-padded, and if the scan width was greater than 128, scans were left-cropped. The left padding was a copy of the leftmost trace.

Every segmentation model had a line scan conversion head at the end. This conversion head was a block consisting of a 2D convolutional layer with a 3×3 kernel and 1×1 padding, a 2D bilinear upsampling layer that brought the output size back up to the original input size followed by ReLU activation, and a 2D convolutional layer with a kernel of input height×3 and padding applied width-wise, but not height-wise, and a channel reduction to 1.

A series of experiments were conducted to determine the optimal model for accurately segmenting a raw GPR scan. Various hyperparameters and model configurations were tested. The results of these tests will be used to guide future tests on data obtained from real-world field tests.

A number of hyperparameters were kept the same during all tests. Each individual input in the batch was standardized per channel using the following formula:

$$I_{std}^{(m \times n \times 6)} = \left[ \ \cdots \ \left[ \frac{C_{k} - \text{mean}(C_{k})}{std(C_{**k})} \right] \ \cdots \ \right] \tag{9}$$

For all tests, the learning rate started off at 1e-4 and was reduced to 5e-5 after 125 epochs. All tests were run for 250 epochs.

Three metrics were used to evaluate the success of the model:

1. Intersection of Union
2. Dice Score
3. Pixel Accuracy (Accuracy)

IoU and dice score are crucial metrics for evaluating line scan segmentation algorithms, with IoU being the most important as this is a segmentation problem.

Deep Supervision: UNet is a widely used image segmentation model, with nearly 60,000 citations as of April 2023. However, it struggles with segmenting fine details, which can represent a problem for GPR scans as they can contain finer details than typical images. To address this, Zhou et al created UNet++, which adds dense skip connections from higher and lower levels of the segmentation encoder and includes deep supervision. This helps to train earlier layers and ensure that finer details are detected. The effectiveness of UNet++ was tested to evaluate whether it can improve segmentation accuracy.

Encoder Type: Segmentation models have an encoder and decoder. The encoder converts data into a form that the decoder can process. VGG16 is the standard encoder for UNet and UNet++. Other encoder networks like ResNets and Inceptionv4 can be used instead of VGG16. Different networks have different capabilities. A test was conducted to see the effect of different encoder types on segmentation.

Encoder Depth: Deep Learning Encoders extract features from images to create a feature map, with deeper encoders extracting more features up to a limit. Using deeper encoder networks can improve models. To test encoder depth effects, increasingly deep ResNet encoders were added to a UNet++ decoder.

Decoder Type: Various segmentation decoders exist beyond the standard UNet and UNet++ algorithms, including Feature Pyramid Networks, DeepLabV3, DeepLabV3+, and Pyramid Attention Networks. Feature Pyramid Networks are similar to UNets but use skip connections and lateral connections passed through a 1×1 convolution. DeepLabV3 concatenates dilated convolutions over an encoded feature map to obtain global features, while DeepLabV3+ is an improved version of this model. Pyramid Attention Networks combine high and low level features using a feature pyramid attention module and global upsampling attention module. To evaluate the effectiveness of these decoders in segmenting GPR scans, tests were conducted using different encoder types. A ResNet34 encoder was used in the first set of tests, followed by an InceptionV4 encoder in the second set, and a RegNetX32 encoder in the third set. These tests aimed to determine the most effective decoder for the GPR scan segmentation task, while also ensuring that the encoder did not significantly affect the model's accuracy.

Decoder Depth: The UNet and UNet++ models use a VGG16 network as their standard decoder. This network decodes by progressively lowering the number of channels within layers in each consecutive block of the decoder network until eventually it the number of channels has been reduced to the number of output channels. To train a CNN to detect more features, the decoder can be modified to have significantly more channels. In testing, a UNet++ algorithm was trained with various encoders and different decoder depths to evaluate their performance.

Type 1 (T1) Decoders had a [16, 32, 64, 128, 256] channel structure. Type 2 (T2) Decoders had a [32, 64, 128, 256, 512] channel structure.

Figure 8:
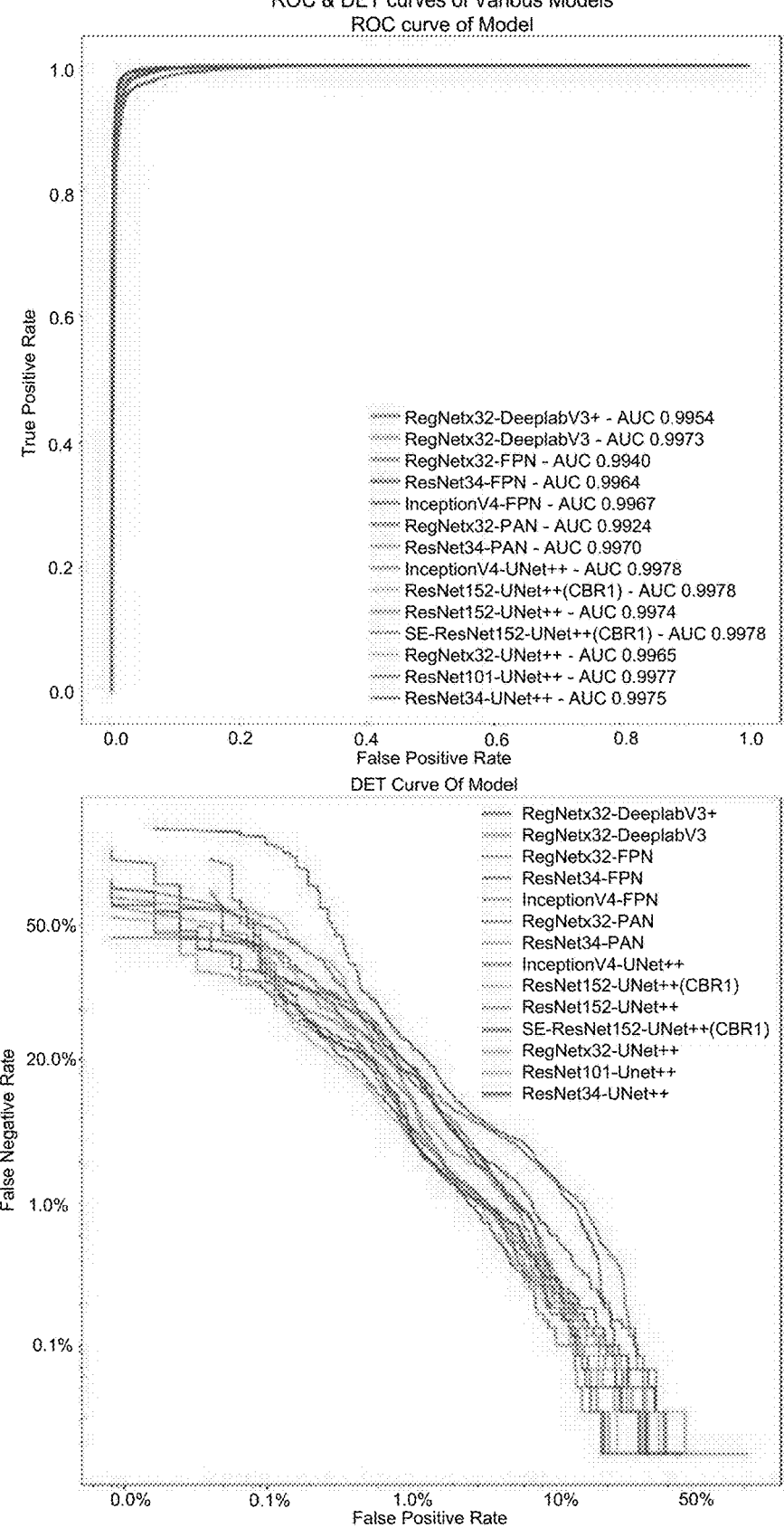
FIG. 8: ROC & DET curves of various evaluated models.

ROC Curves & False Positive vs. False Negative Rate: To assess the performance of moisture detection models, select models were analyzed using receiver operating characteristic (ROC) curves (See FIG. 8). Current moisture detection methods are criticized for high false positive rates, which can be addressed by thresholding, but this increases false negatives. Detection error tradeoff (DET) curves explore this trade-off and provide insight into segmentation models' performance at different scales.

Supervised Learning

Data augmentation was done through random horizontal flips and random resizing. Horizontal flips had a 50% chance of occurring, while resizing had a 75% chance of occurring. Scan resizing meant that the horizontal portions of the scans (and the masks, masks are 1D binary representation of the anomalous—1 and non-anomalous—0 sections in a scan) could be expanded or shrunk by up to 40% compared to the original scan length. When the scans and the masks were resized the masks would no longer be a binary 0 or 1 representation. Thus all the values above 0 were made to 1.

To ensure that the scans could be easily passed through a number of deep learning segmentation algorithms, the height of the scans were fixed to 672—(increased from 655 by padding the scans using the first row as no usable information were contained in the first row of the scan) and the length of the scans were fixed to 128—(If scan length was greater than 128 the scan was cropped, if the length was less than 128 the scan was left padded using the left most trace and the condition of the left most trace is established to be dry).

As described above, two operations were done on the GPR scans—namely, maximum amplitude trace normalization and temporal signal gain. This resulted in three different scans: raw scan data, maximum amplitude trace normalization scan, and temporal signal gain scan. These were further enhanced by finding the Power Spectral Density image for each of the three scans. In total 6 images were produced for each scan and these 6 images were stacked along the channel dimension giving a 6 channel tensor: b×672×128×6.

The processed data was passed through different encoder-decoder (CNN) architecture networks to get a segmentation map as output: b×1×128×1 (the height was reduced to 1 and the channel is reduced to 1 from 6 to represent a 1D binary segmentation map).

Unet and Unet++ models were used to get the segmented outputs. Unet and Unet++ use standard VGG16 encoder networks. The encoder part of these networks were changed to other encoder networks like Resnets and InceptionV4 and the results were compared.

Different encoder-decoder network combinations (Resnets and InceptionV4 for encoder and DeeplabV3 and FPN were used for the decoder) were trained on the data. Some issues identified were: not enough data to generalize to diverse real world situations; real world scenarios will not have clearly labeled data; and anomalous readings are rare by nature, making supervised training challenging.

Unsupervised Learning—Part 1

Similar data augmentation techniques were done as above, except the length of each scan was increased so that it is divisible by 32. Sliding window method of size 32 was used to traverse the data and these 32 width segments were classified into anomalous or non-anomalous sections based on the reconstruction error (if error>threshold anomalous section else non-anomalous section). The model used is an Autoencoder Model.

Next, instead of making the scan length divisible by 32, the scan-data was padded with the first column on the image 16 times at the start and at the end with the last column 16 times. Used a sliding of size 32 to slice the data and feed it into the model. Took the encoder output of the autoencoder model and used t-SNE (to further reduce the dimension to 2) and k-Means to cluster the points into 2 clusters. From the clusters the segmented line scan was created. Similar experiments were done:

by padding the data 8 at beginning and end with sliding window of size 16; and by padding the data 4 at beginning and end with sliding window of size 8.

Next experiment: The data was not padded along the length dimension. Each trace of the scan was passed onto the autoencoder model (sliding window of size 1) and the encoder output of the model is reduced to a dimension of 2 using t-SNE and k-means clustering was used to cluster the trace of the scan and a segmented line scan was created from the cluster plot.

Unsupervised Learning—Part 2

Clustering

KMeans was found to not adequately address the complexity of some GPR data. A first attempt using clustering on the data was KMeans. KMeans is a traditional clustering method that attempts to identify cluster centers in the data and assign every data point to a cluster center. The efficacy of this method of clustering greatly depends on the distribution of the data in the clustering space. Ideally, the data would have evenly shaped clusters with an identifiable center. However, such assumptions could not be made about the experimental GPR data, especially considering the high dimensionality (655 dimensions). From testing, KMeans did not appear to work well with the GPR data.

Spectral clustering (or density-based clustering) proved to be a good baseline method. Spectral Clustering, and by extension perhaps other density-based clustering methods, was found to have acceptable performance on sample GPR data. As such, clustering methods that are more robust to noise and oddly shaped distributions may be advantageous for use with embodiments the present inspection system.

AutoEncoder

Moving from traditional clustering techniques, experiments were performed using deep learning methods, specifically AutoEncoders, for anomaly detection. Our first approach involved training an AutoEncoder to reconstruct the GPR scans that are being fed in as input (including both anomalous and normal readings). The main motivation was to improve on the prior clustering attempts by using the AutoEncoder as a compression method and reducing the clustering dimension. AutoEncoders are known for their ability to learn the salient features of the input data and to compress that information down to a smaller footprint. These compressed features were taken and then clustering was performed on them instead of the reconstructed outputs. This method, however, did not prove to have a significant advantage over the baseline.

The following attempt followed more closely to a typical anomaly detection paradigm. AutoEncoders have been used extensively in anomaly detection, and the typical way they are used involves training the AutoEncoder on only the normal data on the reconstruction task. This way, the AutoEncoder will learn the representations of normal data. The idea is that when the model is fed an anomalous trace, it will fail to reconstruct the trace as it would not know how to interpret the anomaly.

Localization, Mapping, SLAM

Understanding and implementing an accurate method to track the trajectory of the system (e.g., robotic platform) while doing GPR line scans of roof is vital when it comes to pin-pointing the position of moisture, cracks and other anomalies that are identified through GPR scans. Traditional methods such as Wheel Odometry, line following, etc. inherently have errors while estimating the position of the robot due to drift in sensor measurements and due to practical difficulties, such as loss of traction on roof surfaces causing slippage, incline roofs requiring more torque to maintain speed etc. To overcome these errors, other techniques were implemented which includes visual sensors such as cameras and LiDAR (Light Detection and Ranging) which is a device that emits laser light and measures the time taken for light to reflect of an object and detects light. These sensors are used in robotics for the purpose of visual odometry and mapping of algorithms. SLAM (Simultaneous Localization and Mapping) is the study of being able to locate the position of the object while simultaneously mapping the unknown environment the robot is in. These algorithms may be used to track the position of the inspection system and to map the environment.

Visual Odometry

Visual Odometry involves the use of a camera to capture the environment through a lens and incrementally estimates the pose of the robot through the image frames captured by the camera. It uses feature detection, feature matching and bundle adjustment algorithms to detect features between frames of different perspectives to match and uses this information to estimate the position of the robot. Experiments primarily used the COLMAP and ORB-SLAM algorithms for this purpose. COLMAP is a Structure-from-Motion pipeline that works offline, and processes images captured by the camera to reconstruct the map and calculate the position and orientation of the robot. This algorithm used information regarding the camera to be used, the angle of inclination, field of view (FOV) of lens, camera frames per second (FPS), and the camera's intrinsic parameters (including information such as focal length and distortion coefficients). After extensive testing, it was determined that an FOV of 120 and an inclination angle of 20 degrees with a 30-fps proved to be the ideal parameters. The pipeline performs Homography and Transformations used to match the features between images and estimate the pose of the robot. ORB-SLAM is a visual SLAM library that was used for the same purpose. In order to test the efficiency of the algorithms, the camera was used on the roof of a local building while scanning the roof using GPR. The video was captured along the lines of scans and while turning the robot. This video was later used to grab image frames. Every $10^{th}$ frame was captured from 30 fps video and was used in COLMAP and ORB-SLAM for trajectory calculation and mapping the roof.

Both algorithms had problems that caused the reconstruction to fail. Observations proved that the sections where the algorithms failed had dark shadows that caused the algorithm to fail to capture enough features. The uneven roof surface caused sharp jerky motion which once again made it difficult to match features with previous images. Other parameters such as tall roof walls and lack of quality features and fast turns caused the algorithms to fail. While COLMAP did perform marginally better compared to ORB-SLAM, visual SLAM and visual Odometry may not be a general solution to SLAM.

Process

The camera was mounted on the handle of the robot cart and set to 120 FOV and fps frame rate for video capture. A Jetson Nano board was used for storing and recording the video capture. A simple switch circuit was designed to turn on and turn off the camera and a python script will automatically save the video it has recorded.

During the post-processing step, the video was downloaded offline and another python script uses the OpenCV library to run the video and store every $10^{th}$ frame of the video. This means it would effectively capture 3 frames for every second of the video and store it separately.

The camera's intrinsic parameters were extracted after using the camera to capture multiple AprilTag markers and using a python code that performs homography sequentially to generate the camera's intrinsic parameters.

These images were used in COLMAP and ORB-SLAM algorithms for visual odometry. COLMAP begins with feature extraction and feature matching. The user also selected the camera model in COLMAP based on the camera parameters used for capturing the image.

The initial tests performed in an indoor environment used a phone camera to capture the video. A simple pinhole camera model was used in COLMAP to replicate the phone camera model. However, the camera used in outdoor experiments made use of a OpenCV camera model with distortion coefficients.

COLMAP made use of a pre-trained vocabulary tree to perform feature matching for sequential and exhaustive matching and bundle adjustment to reconstruct the point cloud. This data can be saved and the pose calculation for each frame can be saved in a .csv file.

This data stored in .CSV file can be plotted as a point cloud and can be compared with the point cloud of the ground truth which is generated after measuring the lines. The comparison can be performed through an ICP (Iterative Closest Point) algorithm registration.

RTK-GPS

The RTK-GPS (Real Time Kinematics (RTK) Global Positioning System (GPS)) is a unique GPS module that accurately positions itself within a 2 cm accuracy range. The GPS module uses correction data it receives through an NTRIP client/server from its base station along with the satellite signal to accurately position itself as the base station location is predetermined and the relative position of the GPS from the base station can be calculated. The correction data is sent as RTCM signals from the Mount Point base station. The spark fun Zed-f9p module was used along with the U-blox software U-center to interact with the GPS and set up the parameters of the GPS. The GPS was initially tested outside a local building to test the accuracy of the GPS. The GPS was unable to fix in RTK mode where it could not receive the correction data to accurately position itself. Various NTRIP servers (e.g., UNAVCO, RTK2GO and NYSNET) were tested, but RTCM signals were not received. It was later observed that the presence of buildings and trees caused obstruction to receive signals, and this resulted in the GPS failing to fix in RTK mode. The GPS was then tested on an open roof where it was moved along a test bed. The measurements of the test bed were predetermined. This time, the GPS was able to fix itself in RTK mode and receive the RTCM signal. The GPS fluctuated between RTK float and RTK fixed mode while conducting the experiments. The latitude and Longitude coordinates were recorded and later plotted on google earth and the distances between coordinates were measured. The experiment proved that the GPS was able to achieve centimeter level accuracy.

Experiments were conducted with the GPS to be set up as its own base station and to wirelessly communicate with the other GPS module, which is set up as the Rover using the Arduino library provided by sparkfun. However, the library had bugs that caused the data stream frequency to fluctuate, and the Rover could never fix itself in RTK mode. While this GPS is a great solution to accurately pin-point the position of the body, it may not lend itself to uses of the present inspection system owing to the dependency on NTRIP servers providing RTCM signal. The GPS worked best with an open roof that may not be available on all roofs. Finally, the GPS tended to fluctuate between RTK Fixed and Float mode while moving on the roof Process The GPS module was connected to the laptop and received the correction data from NYSNET using the U-center interface from U-blox. The interface allows users to fix the GPS in RTK mode.

Experimented to set up own base and rover station using a pair of zed-f9p modules. Used the ESP32 thing-plus board to support this. Sparkfun has developed an Arduino library to support the ZED-P9p module to set up as a base station.

After extensive experiments, it was observed that the library had problems while logging GPS data as the frequency of logging GPS coordinates kept changing. The RTK mode would fluctuate between float and fixed mode, resulting in loss of data.

The GPS module was moved along a test bed built on a roof. The measurements of the test bed and roof were measured in meters.

The GPS coordinates were plotted on Google Earth images and a GPS calculator code was used to determine the absolute distance between GPS points. These points are part of the test bed and the distance between them are previously determined.

The error between the calculated distance and measured distance was found to be between 5-10 cm for a 5 m and 15 m long distance. This was recorded multiple times to determine the average error which was around 1.3%.

LiDAR Odometry

LiDAR (lidar) is a light detection and ranging sensor that is being increasingly used in the autonomous driving and robotics industry for mapping and pose estimation. Embodiments of the present disclosure may use a solid state lidar with a high FOV and detection range. The Livox MID360 lidar was selected for experiments. The MID360 is a state-of-the-art solid state lidar with a 360-degree Field of View horizontally and 52-degree Field of View vertically and can detect objects up to 70 m away. It has a point rate of 200,000 points/s. The highlight of this lidar is that it remains unaffected by sunlight and can be used in outdoor conditions. The solid state lidar does not involve any moving mechanical parts and has an in-built 6-axis (3-axis accelerometer and 3-axis gyroscope) inertial measurement unit (IMU). While Livox does provide their own point cloud visualizer, the ROS framework and Livox ROS drivers were used to collect the recordings and process it using various Lidar Inertial Odometry (LIO) algorithms. These are 3D mapping and odometry algorithms that are used in the field of Lidar SLAM to map the environment and to estimate pose tracking of the lidar for trajectory generation. The lidar outputs point cloud data and these algorithms use sequential point clouds for point cloud registration and use this information to estimate the pose of the lidar. Pose graph optimization, feature extraction, tracking and matching and reconstruction. LIO algorithms such as FAST_LIO, LIO_SAM and DLIO (Direct LIO) are used for this purpose of mapping the roof environment as a point cloud and for pose estimation of the Lidar.

A test bed was set up in an open roof and the lidar and GPS were moved along the test bed simultaneously to collect the recordings. Multiple experiments were conducted to understand the efficiency of these algorithms for use in the present application and various conditions were simulated including vibrations, fast turns, dynamic obstacles etc. The coordinates of pose estimation is compared with the ground truth of the test bed to understand the error of algorithms for different use cases. The RTK GPS recording was also fused with the lidar measurements using an Extended Kalman filter to observe if this sensor fusion improves the pose tracking of these algorithms.

Although Livox offers the option to view the recording in Livox's own point cloud viewer, these experiments require the use of the ROS noetic framework and ROS packages.

Process:

Installed the Livox Ros drivers and Lidar Inertial Odometry packages.

The same test bed used for GPS was used for Lidar mapping as well.

A 3D printed mobile platform is used to mount the MID360 lidar, The LiPo battery, Raspberry Pi 3B and all the respective wiring. This platform moved on the bed for the lidar to collect recordings as Rosbag files.

The mapping algorithm subscribes to the Lidar point cloud data which is either recorded in pointcloud2 format or the Livox Custom format. The rosbag files are saved in the Rpi SD card as wireless transfer results in data loss.

After testing various algorithms that are compatible with the Livox MID360 lidar, decided to test 3 most consistent algorithms including FAST_LIO, LIO_SAM MID360 and DIRECT_LIDAR_INERTIAL_ODOMETRY.

Other packages such as A-LOAM and LIO-Livox were also considered but resulted in poor results or had compatibility issues to test with.

The lidar was moved along the test bed and the recording was saved in the Raspberry Pi SD card. These rosbag files were later processed with these algorithms using the ROS framework and the pose estimation coordinates were saved in the .CSV file.

The .CSV files were used to generate the point cloud of the pose tracking and this point cloud was compared to the point cloud of the ground truth measurements of the test bed. This comparison is done using an ICP registration to compute the error between the ground truth and Lidar odometry algorithms.

Report Generation

Reports of the GPR scan results on roof scans may be generated. The following discussion describes an example (i.e., non-limiting) embodiment of such report generation. The results obtained after processing the GPR data using the AI models may be generated as lines with markings for anomalies. Code has been developed to fit the results on the top view image of the roofs to pin-point the location of these anomalies. For example, an image of the roof may be opened in a window and the user may select the start and end points of the section scan. These points may be recorded as pixel coordinates of the image and these coordinates may then be used as input to fit the lines with anomaly markings within the section of the roof. This allows for the user to view the AI model results on the actual image of the roof which allows for the user to further segment the roof as sections and portions.

Coordinate Generation

1. Recording Movement

Video Capture: A real-time video recording of the robot's movement on the roof is carried out. The video serves as a visual reference for the path the robot has taken.

Line Segment Measurement: Alongside the video, the distances of line segments that the robot has traveled and scanned are measured, providing quantitative data regarding the robot's journey.

2. Creating Text File

Data Interpretation: The information from the video and line segment measurements is interpreted and translated into a specific format.

File Structure: A text file is created containing line segments and directional data (up, down, left, right). It captures the robot's trajectory from the starting point in a format that can be easily processed.

3. Generating Coordinate Points

Python Script Utilization: A tailor-made Python script reads the text file created in the previous step.

Coordinate Calculation: The script calculates coordinate points based on the line segments and directional data, setting the starting point at (0,0). This conversion transforms the abstract data into spatial coordinates that describe the path of the robot accurately.

4. Graphical Representation

Excel Integration: The generated coordinate points are imported into Excel or similar data visualization software.

Line Graph Creation: A line graph is meticulously constructed using the coordinates, offering a graphical interpretation of the robot's path.

5. Superimposition with Roof Image

Top View Image Selection: An image depicting the top view of the roof is chosen as a reference.

Superimposition Process: The line graph is carefully aligned and superimposed over the roof image. This layering creates a composite visualization that accurately portrays the robot's ground truth path.

6. Getting the Image Coordinates and Plotting

Points: After superimposing the path over the roof image, the start and stop points for each scan is selected in the superimposed image and is saved into an excel file.

Plotting: A python script is made which reads the excel file containing the image coordinates and the JSON file which contains the AI model's predicted output of the GPR scans. This script then plots the line scans onto the roof image accurately positioning them based on the start and stop image coordinates.

7. Applications and Analysis

Path Optimization: The generated coordinates can be used to analyze and optimize the robot's movement for efficiency and accuracy.

Error Detection: By comparing the robot's actual path with the intended path, discrepancies can be identified and rectified.

Behavioral Analysis: Understanding the movement pattern can lead to insights into the robot's behavior and performance, contributing to future enhancements.

Report Generation

The process of generating detailed and image-intensive reports is a complex task. Our reports are often extensive and include a wide variety of images. Creating them manually was found to be both time-consuming and challenging. In response to this challenge, we have streamlined the process through automation, employing Python scripts and systematic file organization. Below is a detailed breakdown of the method:

1. Establishing Generalized File Directory

Storing Metadata: A centralized file directory is created to store vital meta-data, including corporate images like logos.

Image Organization: Individual images needed for each report are also organized and stored in this directory. This method simplifies the retrieval of images during report generation.

2. JSON File Creation

Information Compilation: A JSON file is created to house all crucial information needed for the report, such as client name, location, date, etc.

Image Mapping: Within the JSON file, an image mapping system is included. This structure ensures that all images are inserted in the correct positions within the report.

3. Python Script Development

Script Function: A Python script has been specifically developed to traverse the JSON file and the associated file directory.

LaTeX Format Generation: As the script processes the information, it generates the report in LaTeX format. This standardized format ensures consistent and professional document layout and design.

4. Compilation and PDF Creation

Generating Python Files: The script outputs .tex files, reflecting the LaTeX formatted report.

Utilizing pdflatex Package: The .tex files are then compiled using the pdflatex package in Python, transforming them into PDF documents.

Client Delivery: The final PDF is readily available for dissemination to the client.

5. Benefits and Efficiency

Time Reduction: Using this automated Python script process, the report generation time is drastically cut from hours to mere minutes.

Consistency: Automation ensures consistency across multiple reports, maintaining a uniform look and feel.

Scalability: The system is designed to handle reports of varying lengths and complexities, allowing for adaptability to different project needs.

The transition from manual report creation to an automated Python-scripted process represents a significant advancement in efficiency and reliability. This innovative method of report generation not only saves valuable time but also enhances the quality and consistency of our client reports. The utilization of technologies such as LaTeX and JSON, coupled with smart file organization and scripting, provides a robust solution that can be tailored to a wide array of reporting requirements.

ADDITIONAL ASPECTS/EMBODIMENTS

The following sections present further detail and context via experimental systems, which are intended to provide further example details of embodiments of the present disclosure. The below discussions are not intended to be limiting unless expressly stated.

In another aspect, the present disclosure may be embodied as an inspection robot. The inspection robot includes a platform configured to hold one or more sensors. At least one tether is attached to the platform. The tether may be, for example, a rope, cable, wire, strap, etc. The inspection robot includes a thrust generator, such a propeller, fan, ducted fan, turbofan, etc. The thrust generator is configured to urge the platform against a surface to be inspected. For example, where the surface to be inspected is a wall, the thrust generator may be configured to push the platform against the wall. More than one thrust generators may be used. For example, the inspection robot may be configured as a four-rotor drone and used in a non-traditional vertical orientation such that the propellers of the drone are used to push the drone against a wall to be inspected (e.g., scanned).

The platform is moved along the surface by way of the tether. For example, the platform may be configured to move along the tether. The platform may use a motor, an actuator, etc. to move along the tether. In other embodiments, the tether may be used to move the platform. For example, one or more operators may pull the platform by way of the tether. In another example, more than one tether may be used to move the platform in more than one direction (e.g., move the platform along a linear path, move the platform in any direction on a plane, etc.)

In another aspect, the present disclosure may be embodied as an inspection system having a visual image sensor (e.g., an RGB image sensor) and a thermal image sensor. A processor is in electronic communication with the image sensor and the thermal image sensor. The processor is programed to align an RGB image (received from the image sensor) with a thermal image (received from the thermal image sensor). The images may be aligned using a calibration target, such as, for example, a target having one or more AprilTags (further described below).

The processor includes a machine learning processor trained to detect thermal anomalies in the aligned RGB image and thermal image. The thermal anomalies may include water penetration/infiltration, air leakage, improper insulation, and thermal bridging, and the machine learning processor may be trained to classify thermal anomalies as one of these types.

The RGB image and the thermal image may be registered to one another using a direct linear transform technique. A correlated region of interested (ROI) may be extracted from the (registered) RGB and thermal images to create an input dataset of a deep-learning neural network. A convolutional neural network may the use correlated 4 channel tensors of one consistent height and width, allowing the analysis of images from various visible (e.g., RGB) imaging sensor and thermal imaging configurations. In some embodiments, the RGB image and the thermal image are stitched together for presentation as a single image.

The term processor is intended to be interpreted broadly. For example, in some embodiments, the processor includes one or more modules and/or components. Each module/component executed by the processor can be any combination of hardware-based module/component (e.g., graphics processing unit (GPU), a field-programmable gate array (FPGA), an application-specific integrated circuit (ASIC), a digital signal processor (DSP)), software-based module (e.g., a module of computer code stored in the memory and/or in the database, and/or executed at the processor), and/or a combination of hardware- and software-based modules. Each module/component executed by the processor is capable of performing one or more specific functions/operations as described herein. In some instances, the modules/components included and executed in the processor can be, for example, a process, application, virtual machine, and/or some other hardware or software module/component. The processor can be any suitable processor configured to run and/or execute those modules/components. The processor can be any suitable processing device configured to run and/or execute a set of instructions or code. For example, the processor can be a general-purpose processor, a central processing unit (CPU), an accelerated processing unit (APU), a field-programmable gate array (FPGA), an application-specific integrated circuit (ASIC), a digital signal processor (DSP), graphics processing unit (GPU), microprocessor, controller, microcontroller, and/or the like.

Experimental Embodiment—"EASEEbot: Envelope Assessment System for Energy Efficiency"

The mission of EASEEbot is to make building inspections safer, more comprehensive, and less expensive. The EASEEbot ecosystem is the next generation of technology for non-invasive building inspection, diagnosis, and retrofit construction. EASEEbot has been designed to benefit technical building inspectors, building scientists, and structural engineers. During inspections, drone pilots and safety officers first ensure that a building site is safe for drone flight. They then program a flight path for the EASEEbot drone to capture the building's 3D point cloud while automatically avoiding minor obstacles. Attaching a radar module to the EASEEbot drone allows it to find envelope issues hidden deep within the building wall assemblies, like moisture and corroded wall ties. The captured thermal, color, and radar data is fed to EASEEbot's artificial intelligence, which generates a building's digital twin, analyzes data, and maps identified defects spatially to the façade. A building inspector can then review the outputs and make informed decisions on where to retrofit and repair the building envelope.

Motivation: Reductions in carbon emissions are necessary to comply with ever-improving energy and greenhouse gas emission standards in the United States. Municipalities nationwide have enacted stringent regulations to address excessive GHG emissions. New York City is leading the way by enacting ambitious regulations like Local Law 97 (LL97) and aims to cut emissions from the city's largest buildings by 40% and 80% by 2030 and 2050, respectively.

Building owners are now burdened with the externality cost associated with GHG emissions through regulation. Building owners have already maximized efficiency gains in their mechanical and electrical systems; the only remaining place to make improvements is in the building envelope. To diagnose envelope issues and recommend improvements, inspectors must conduct high-quality building envelope inspections and energy audits. A quality inspection must answer the following questions: What defects are present in the building envelope? Where are they located? To what extent does the envelope require spot repairs or complete replacement?

Challenges: To perform high-quality inspections with conventional methods, inspectors must deal with safety hazards and accessibility issues such as working at height, working in cold & icy conditions, gaining roof access, and finding appropriate vantage points. Quality inspections require highly trained inspectors to utilize various testing tools such as infrared cameras, wall assembly probes, and moisture meters. The effectiveness of typically used non-destructive inspection tools depends on the inspection's experience. Non-destructive tools usage does not always guarantee that inspectors will find or diagnose building envelope issues. Thus, destructive testing and probing are often used to search and verify areas of suspected damage.

Inspectors will generally spend from 2 to 5 days performing inspections on multifamily and commercial buildings and an additional 3 to 5 days generating a high-quality report. Clients desiring a quality inspection incur high monetary and non-monetary costs.

Scaffolding costs for façade access can range between $4,000 and $8,000, are invasive and disruptive to building occupants, and carry a risk of damaging the façade. Boom trucks are a safer alternative for both inspector and client, but costs range from $10,000 to $15,000 for full-day rentals and generally require municipal permits to operate. Suspended scaffolding carries a high risk of façade damage, a high life safety risk to the inspector, and is often the only conventional inspection technique available on high-rise construction. Inspectors can outsource risk to rope access firms, but inspections cost a minimum of $4,000, and the overall risk is not mitigated, only transferred. Conventional inspection methods are costly, time-consuming, disruptive, and pose a risk of property damage, workplace injury, and even fatality.

Moreover, projections for the supply of well-trained inspection and retrofitting staff and demand for envelope inspection services show that there will be a significant storage in labor resources by 2025 and 2030.

Solution: Current inspection solutions are unable to adequately address the innumerable and complex challenges faced by building scientists, engineers, and inspectors. Solutions must be non-destructive, act as a productivity multiplier, mitigate risk, be competitively priced, leverage the skills of junior engineers, and produce high quality results. Some embodiments of the presently-disclosed inspection system utilize robots and artificial intelligence (AI) for façade inspection and analysis to assist building envelope inspectors at every stage of the building retrofit process. For example, in an aerial platform, the EASEEbot unmanned aircraft system (UAS) safely flies around a building and non-destructively captures color and infrared imagery in a fraction of the time of a conventional inspection. This data is processed by the EASEEbot thermal AI to detect envelope issues like trapped moisture, air leaks, and thermal bridges. Attaching the EASEEbot radar module converts the UAS into a wall climber and allows users to find previously undetectable façade issues like deep moisture penetration and corroded wall ties in a non-destructive fashion. The dataset is further processed and then fed to the EASEEbot 3D reconstruction algorithm to generate a digital twin of the inspected scene and map it out as a 3D point cloud of the exterior façade—scanned imagery data is organized by its 3D pose. This automatically generated 3D digital twin visually and intuitively displays envelope issues and their respective locations spatially on the building. A building inspector can then review that analysis and make informed decisions easily on where and how to retrofit and repair the building envelope. Automation in data collection and analysis in EASEEbot's solutions will improve inspectors' productivity, and the resulting digital twin will serve as an organized and spatially mapped historical record of the inspected building for future inspections.

In another example, during retrofit construction, the EASEEbot Retrofit Robo-Dog may use building information models based on previous 3D point cloud scans to visualize the previously recorded and detected defects onto corresponding surface areas of the building's envelope through a projector-based augmented reality system on a Robo-Dog. In the process, it guides construction inspectors and retrofit workers to ensure those defects are properly addressed. The Retrofit Robo-dog makes it easy for workers to understand where issues are and conveys context-specific retrofitting information related to those issues. Building construction is non-standard and construction is still best carried out by human workers who can use their work experience and adapt to non-standard conditions. The EASEEbot system represents the next generation of non-destructive testing, diagnosis, and retrofit technology designed to benefit building inspectors, building scientists, and structural engineers.

Energy Efficiency Benefits: The EASEEbot UAS's sensing and mapping capabilities combined with AI-based analysis can identify air leakage locations, and moisture-laden areas in building envelopes. The Environmental Protection Agency (EPA) estimates that reducing air leakage can result in heating and cooling cost savings for residential homes at around 11-15%.

Roughly half of the US building stock is made up of older buildings built before modern day energy codes. For them, air sealing savings could be much higher. Meanwhile, envelope moisture issues contribute to incidents of mold and ice damming, which reduce the durability of envelope components and increase envelope life cycle maintenance costs. While the embodied energy saved through these efforts are not easily estimated, it can be expected that these embodied energy savings will matter much more as buildings become more operationally efficient. The Retrofit Robo-Dog also has benefits for envelope and energy retrofits, especially on large building projects where coordination between the inspection and retrofitting teams is critical for project success. While coordination improvements' impact on energy savings cannot be directly quantified, it is worth noting that any improvements to the process of retrofitting larger, complex, whole-building projects will make an impact in reducing the carbon footprint of the built environment.

EASEEbot Data Collection System

Figure 9A:
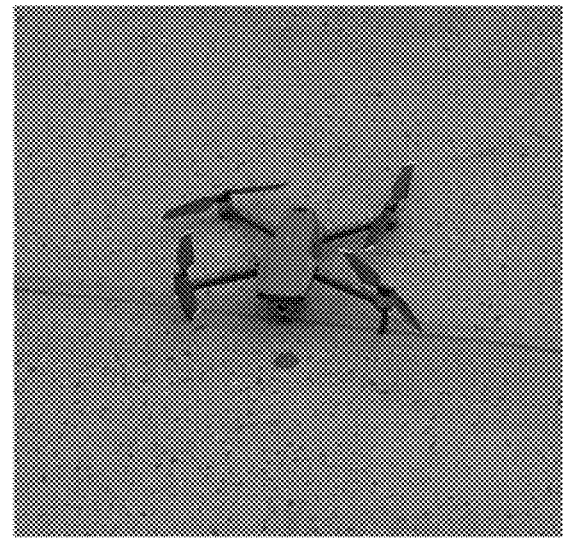
FIG. 9A: Another embodiment of an inspection system according to the present disclosure.
Figure 9B:
FIG. 9B: An embodiment of an image sensor for an inspection system.

Hardware—Flight Mode: In an aerial embodiments, a UAS may fly with sensors and follows preset flight trajectories. The EASEEbot UAS is designed to be foldable. Bounding box dimensions are 8.43×3.58×3.31 inches (L×W×H) for folded and 12.68×9.53×3.31 inches (L×W×H) for unfolded (see FIG. 9A). An integrated dual-lens sensor module, which has a 640×512 resolution uncooled VOx microbolometer and a 4K RGB color camera, is attached to the UAS with a gimbal (FIG. 9B). The UAS also has a micro-USB port on the top of the fuselage to transmit additional sensor data or provide power to the beacon for night flight. There are six cameras and two linear LIDAR sensors installed on the fuselage, which are used as the sensor input for the automatic omnidirectional obstacle avoiding system.

Figure 10A:
FIG. 10A: Another embodiment of an inspection system according to the present disclosure.
Figure 10B:
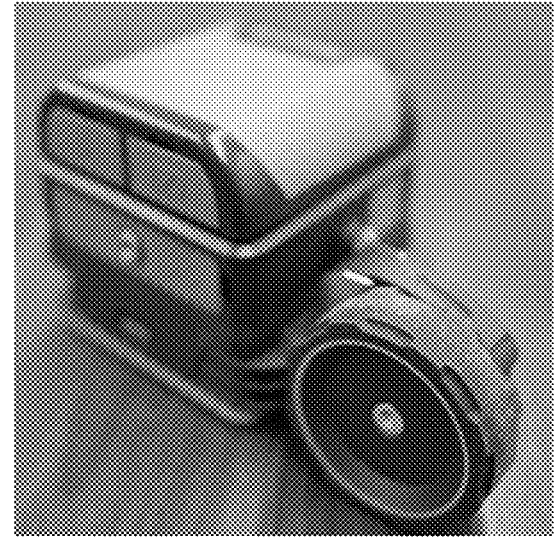
FIG. 10B: A embodiment of a radar sensor for an inspection system.

Hardware—Wall Climber Mode: When used as a wall climbing platform, the UAS may be connected to a tether system and a ground-penetrating radar (GPR) sensor (FIGS. 10A and 10B). The tether is attached to an additional sandwich adapter between the UAS battery pack and fuselage to serve as additional power supply for the UAS. Due to high electrical resistance of the long tethered cable and other safety concerns, voltage is increased from 48V to 400V when the tether system's ground power supplier transmits power to the adapter, and then stepped down to the UAS operation voltage. The GPR sensor is to be installed above the center of gravity of the UAS, fixed with two screws on each side. The GPR sensor can draw power via micro-USB port. Meanwhile, the gimbal on the UAS can remain attached, due to the infrared camera sensor module's compact size. The UAS may take off from an orientation parallel to the building façade. Prior to take off, the UAS's onboard inertial measurement unit (IMU) and the automatic omnidirectional obstacle-avoiding system may be disabled. The linear LIDAR sensors on top of the fuselage will detect the distance between the fuselage and wall and control the motor's throttle to ensure the GPR touches firmly on the building façade.

Software—Stereo calibration: Stereo camera calibration ensures that minor variations in the relative location of the thermal and RGB camera caused during the manufacturing process do not affect the ability for machine learning systems to post-process and analyze input data.

Stereo Calibration can be performed on each EASEEbot drone. Each drone has its own stereo calibration matrix. For example, calibration is carried out using a checkerboard created with materials that have different emissivity and colors so that checkerboard squares are sufficiently different in both the thermal and RGB images. Calibration is conducted using OpenCV which is an open-source computer vision library. In other embodiments, an AprilTag is used to perform more accurate stereo calibration.

Figure 11:
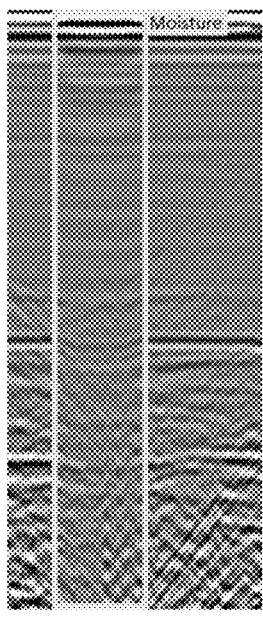
FIG. 11: An example output of a GPR scan analysis to detect moisture.

Software—GPR AI (FIG. 11): This is a non-destructive sensing and inspection tool that is used on suspected problem areas. Users attach the Proceq GP8800 unit to EASEEbot and connect it to their iPad. GPR readings are taken along a wall surface and automatically tracked by Proceq's data capture system on the iPad. Workers can scan up to 100 meters or more in a single run. Once the wall climber has completed its scan, the scan data can be exported from the iPad to a server. Scans are then sent through our GPR-specific AI to label anomalous areas which indicate moisture may be present deep within the envelope's assembly. The EASEEbot system may take a video during the wall climb, to record the 3D location of the GPR as it traverses the wall. This video may then be integrated into a 3D reconstruction algorithm of the building to determine EASEEbot wall climber's location relative to the building at the time of GPR scan. The GPR scans are put through binary convolutional network. A convolutional neural network (CNN) convolves through the scans to label a section (for example, an approximately 1-ft section) as either anomalous or normal. The network has a VGG-16 backbone for dimensionality reduction and image processing. The output from the VGG-16 backbone is fed into two fully connected layers and an output layer. The output layer has a sigmoid activation function that makes the final anomalous/non-anomalous determination of a scanned section. The deep learning networks may be built in PyTorch using Python. Network architectures of the exemplary embodiments can be found in the Design Specifications of this submission.

Figure 12:
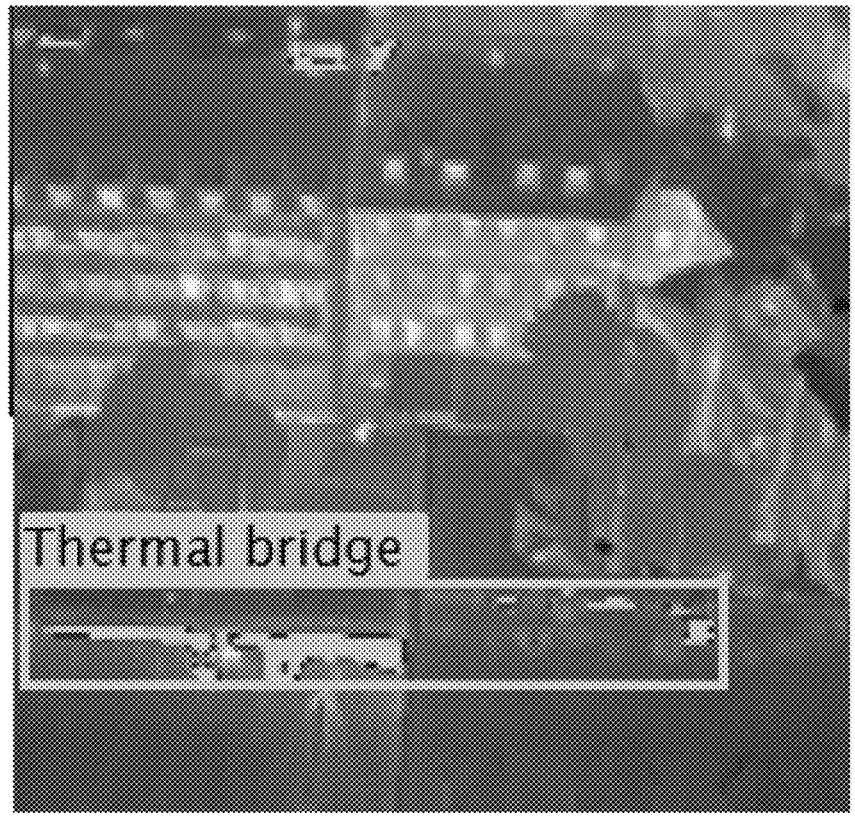
FIG. 12: An example output of a thermal image analysis to detect thermal anomalies.

Software—Thermal AI (FIG. 12): EASEEbot's thermal AI algorithm is a modified UNet algorithm developed using PyTorch. An image is input as a 4 channel tensor composed of red, green, blue (RGB) and thermal (T) channels. Prior to image analysis, thermal and RGB scans taken during UAS inspections are registered using our stereo camera calibration algorithm and concatenated into a 4 channel RGBT scan video. The RGBT scans videos are then sectioned into individual frames, which form a building-specific dataset. The RGBT dataset is fed into our pretrained neural network model to create segmentation masks for detected thermal and moisture anomalies. The segmentation mask is a binary channel picture of the same size as the input RGBT image where every pixel corresponds to the pixel in the RGBT image; the top right hand pixel in the RGBT image corresponds to the top right hand pixel in the segmentation mask. The default value of every pixel in the segmentation mask is 0, meaning no defects. Where the AI algorithm has detected a thermal anomaly, the value of the pixel is 1 or greater depending on how many anomalies have been detected in an image. The RGBT image is then processed back into separate RGB and T data streams. The segmentation masks are applied as an outline to both RGB and T data streams and reviewed by a building scientist to ensure that all masks are accurate. Corrections are made using the CVAT which is an open source computer vision annotation tool. The RGB image stream is further processed—segmentation masks are filled in as neon pink. The processed RGB images are then sent to the 3D reconstruction algorithm.

Figure 13:
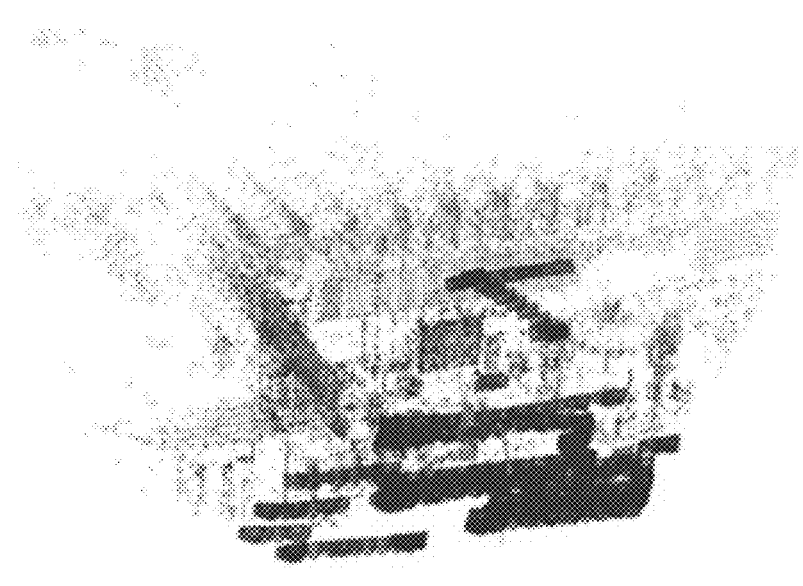
FIG. 13: An example 3D reconstruction.

Software—3D Reconstruction Algorithm (FIG. 13): EASEEbot's 3D reconstruction algorithm is based on the structure-from-motion (SfM) algorithm. While the UAS is in flight, images are captured every 15 to 25 frames in RGB color and infrared videos, while onboard GPS records the location of the UAS cameras and their viewpoint direction for when each image is captured. The capture interval depends on the complexity of the building envelope. Once all the images are captured, feature points are extracted from each image through a pre-trained machine learning neural network. By identifying common feature points shared between pairs of video frame images, and knowing the difference between the two images' respective camera 3D locations and viewpoint directions, the 3D location of those feature points can be inferred. The GPS data associated with each image, as well the timing of each image in videos can be used to initially group the images by rough general locations in 3D space. An additional graph neural network and attention mechanism are used for matching feature points among locally grouped images. A global list of feature point matches is then compiled by tabulating common feature points over all localized groups of images. Using this global list of common image-feature points and calculating all matched images' respective differences in camera translation and rotation, the algorithm estimates the 3D location of each feature point, and a sparse 3D point cloud is generated. Noise in 3D point cloud estimations are reduced by bundle adjustment, which tries to make the point estimations more consistent over the entire scan.

Figure 14:
FIG. 14: An embodiment of an EASEEbot retrofit to a robo-dog.
Figure 15:
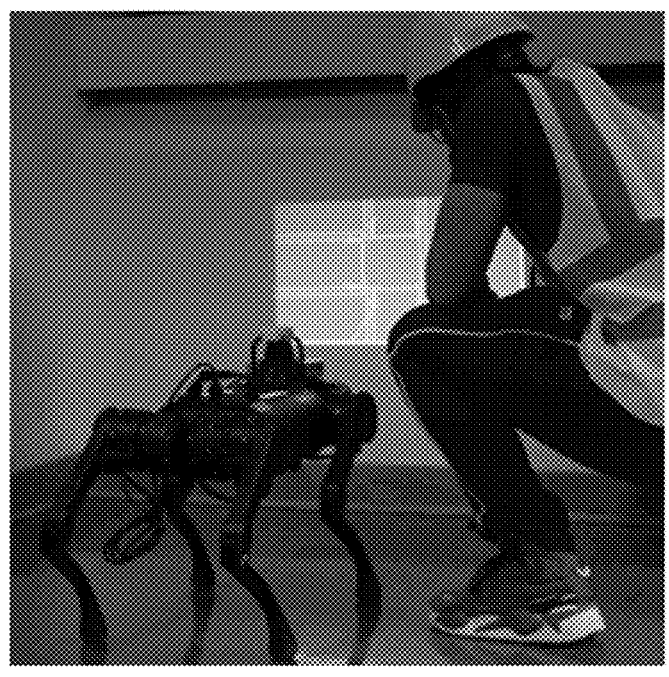
FIG. 15: Another embodiment of an EASEEbot in the form of a robo-dog.
Figure 16A:
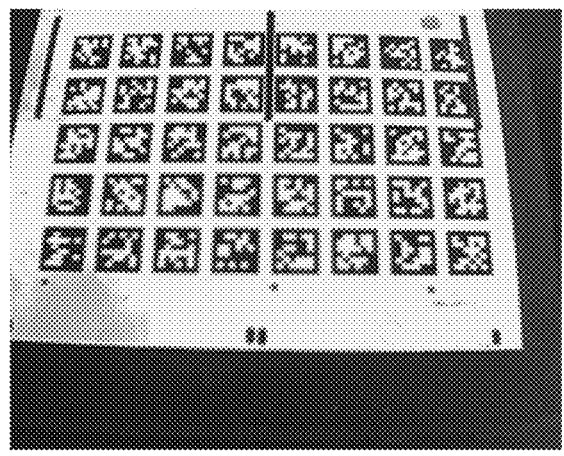
FIG. 16A: Uncalibrated and Distorted Thermal Image.
Figure 16B:
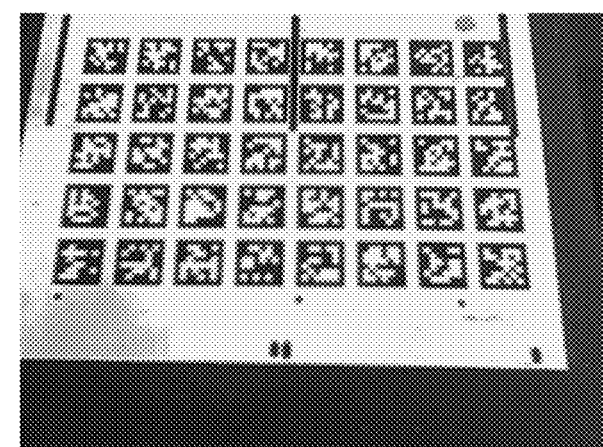
FIG. 16B: Calibrated and Undistorted Thermal Image.
Figure 17:
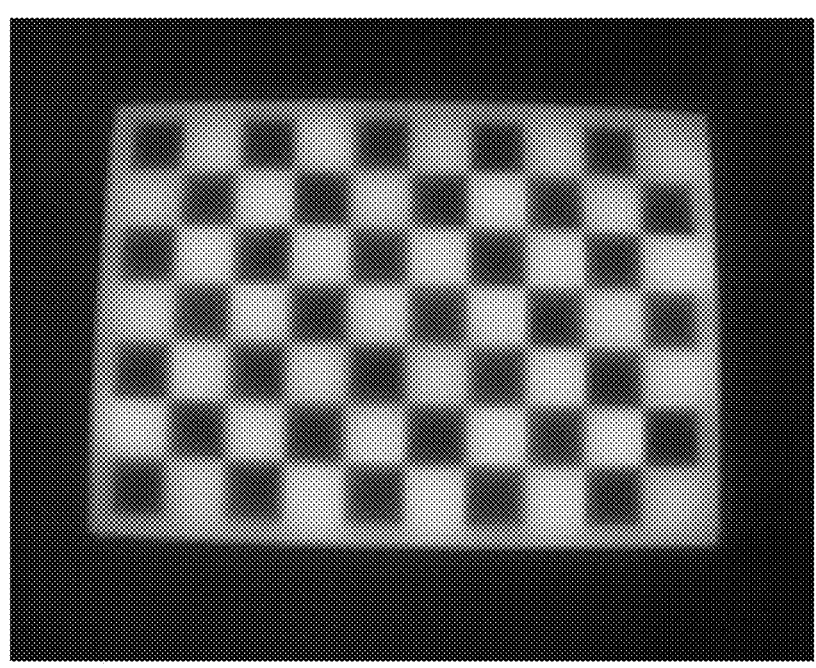
FIG. 17: Uncalibrated and distorted thermal image of a checkerboard (corners of the checkerboard are known to lie on straight lines).
Figure 18A:
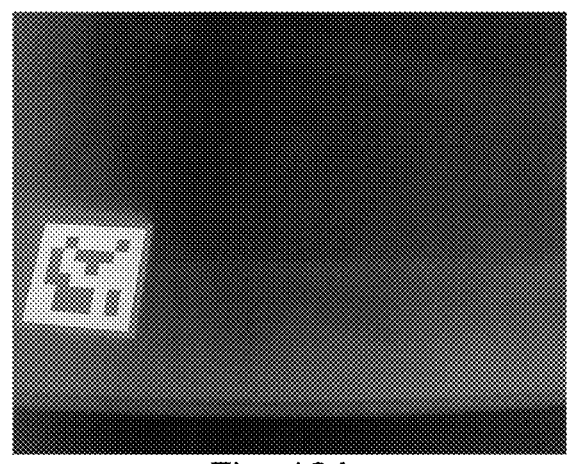
FIGS. 18A and 18B: Thermal reflections are more easily visible in the metal portions of the calibration board (a) Heated Calibration Board; (b) Cooled Calibration Board.
Figure 18B:
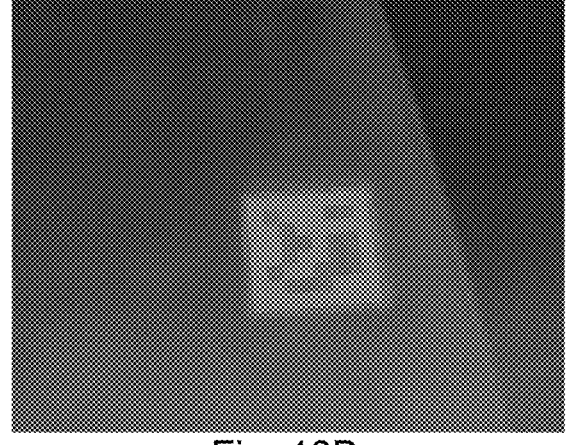
Figure 19:
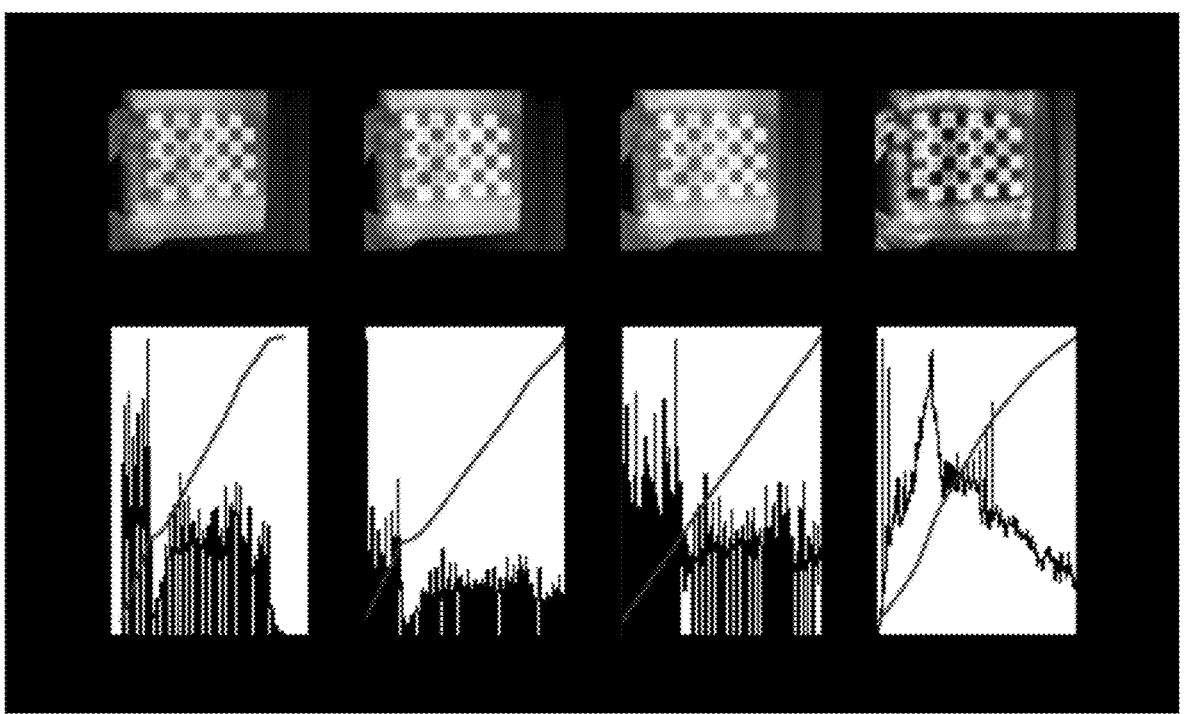
FIG. 19: Image enhancement techniques were not able to improve the checker detection on the cardboard and acrylic calibration board due to uneven heating and cooling over the board.
Figure 20:
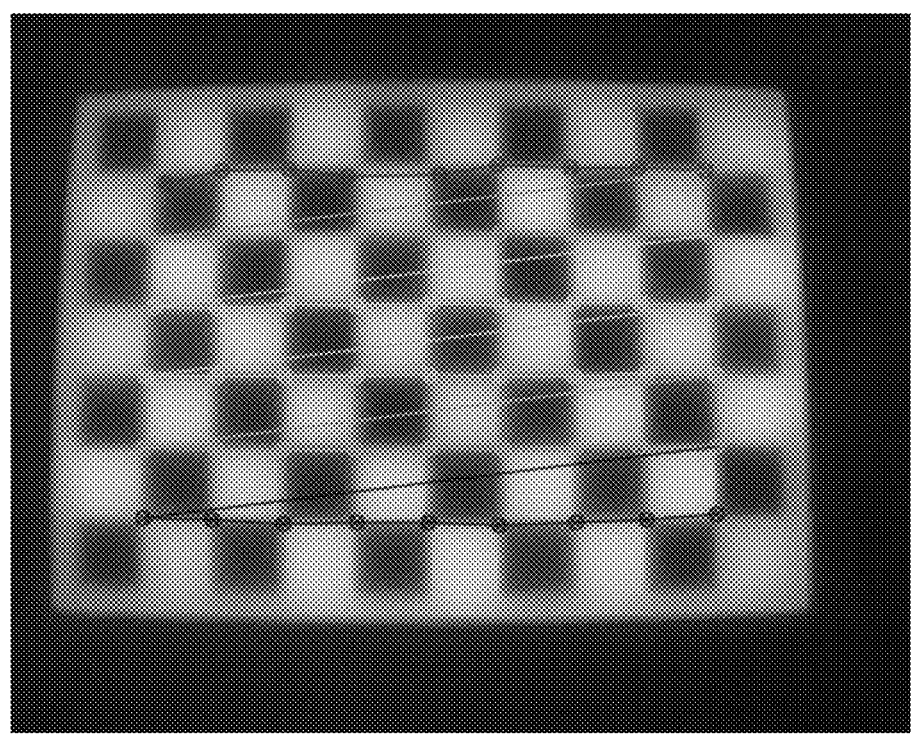
FIG. 20: Corner detection issues on calibration boards with spatial offsets.
Figure 21A:
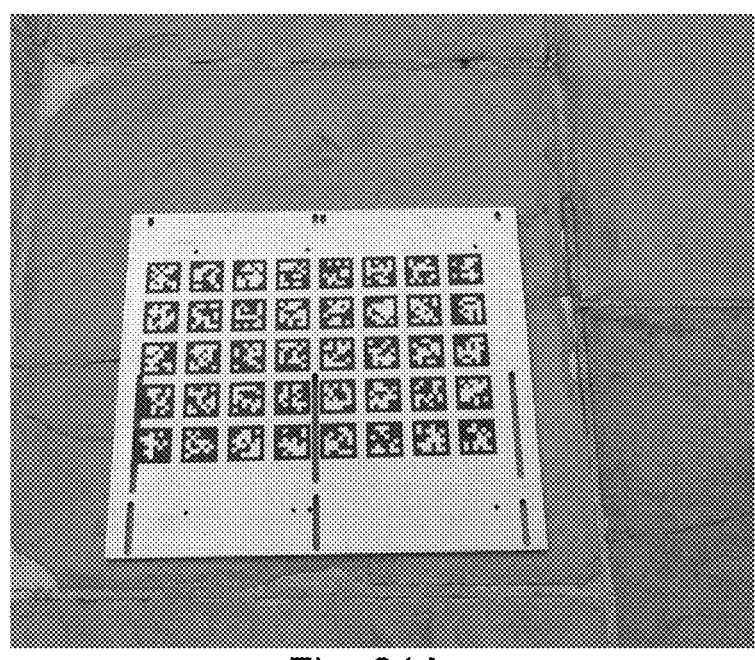
FIG. 21: An example of an undistorted image pair. (a) Undistored RGB Image; (b) Undistorted Thermal Image.
Figure 21B:
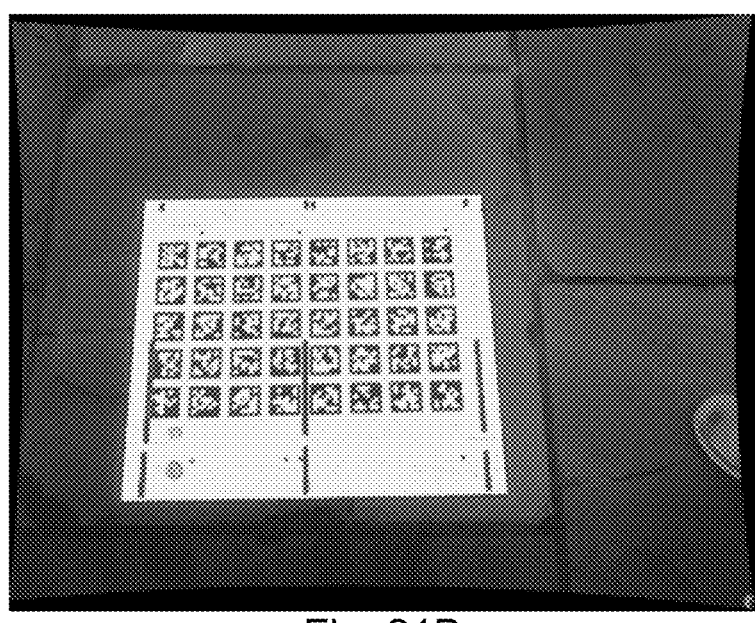
Figure 23:
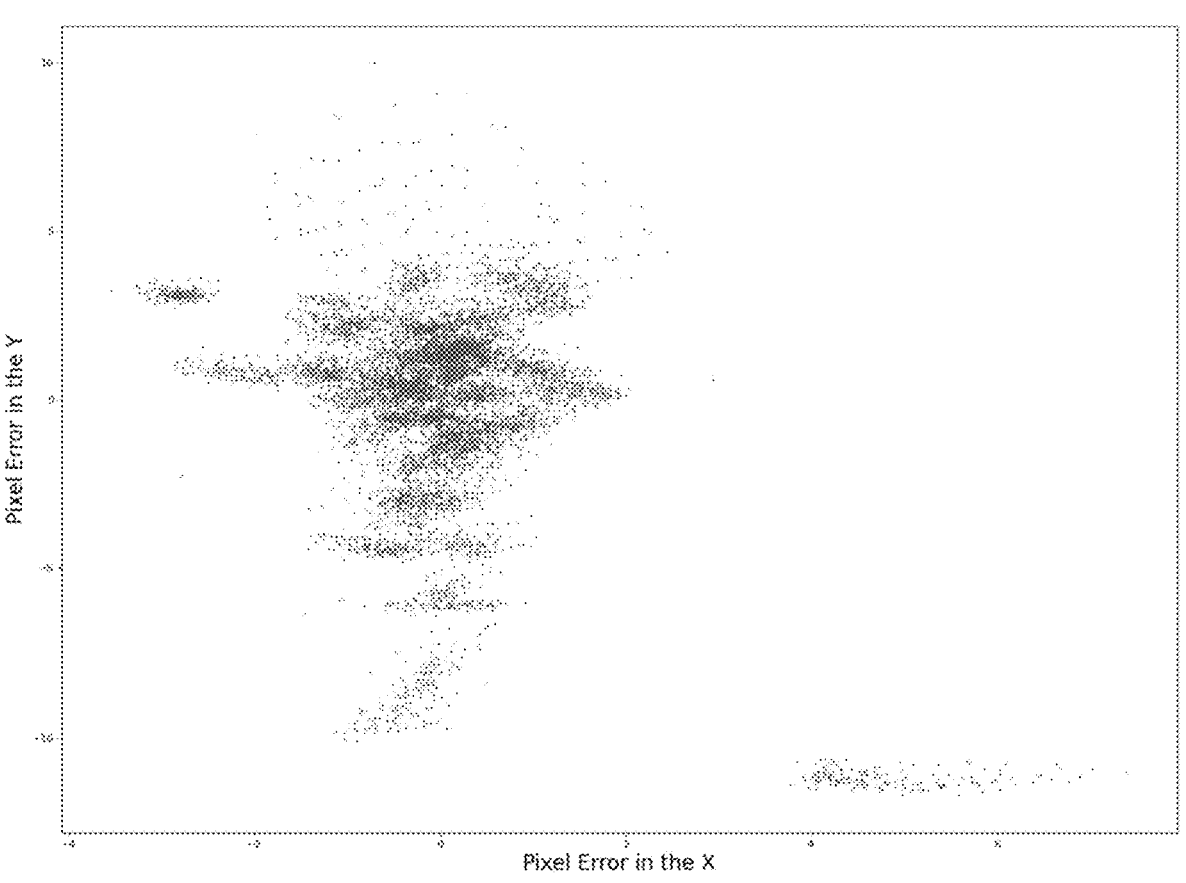
FIG. 23: Image Registration Errors between Simultaneously Captured RGB and Thermal Images.
Figure 24:
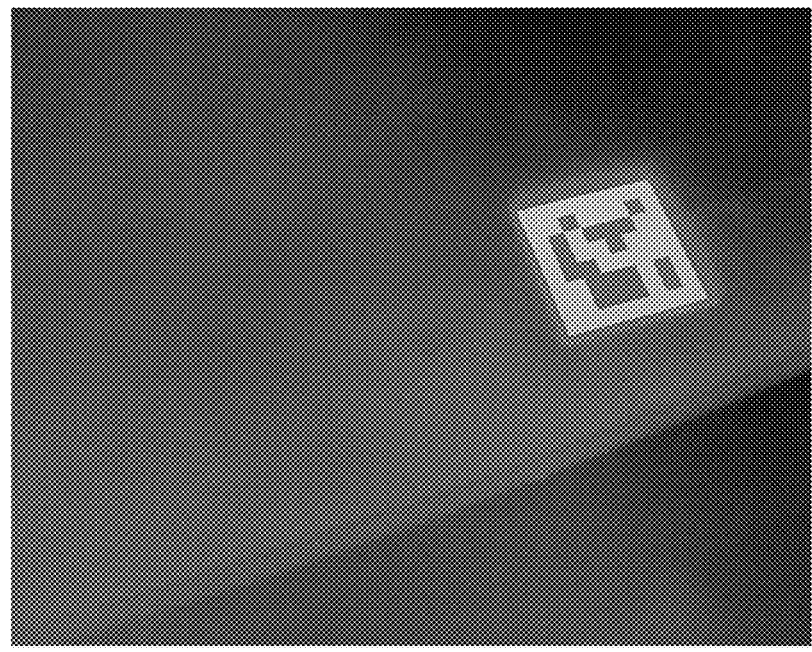
FIG. 24: Thermally observed AprilTag marker that could be used to provide common feature points in RGB and thermal images.

EASEEbot Robo-Dog Embodiment (FIGS. 14 and 15)

Hardware: Temporary material stockpiles (e.g., scattered electrical wires, etc.) are primary mobility and navigation challenges for mobile robots on a retrofitting site. The EASEEbot Retrofit Robo-Dog's flexible legs can navigate around these obstacles better than crawling and wheeled robots. An example robot dog has four high torque motors to control each leg and body pose individually.

A ball-shaped force sensor was installed on the "foot" of each leg, which provides a feedback signal to estimate the pose of the robot dog and the level of the ground. At the front of the robot dog, a distance perception module was installed, including a Lidar and a dual-lens 3D camera. This module assisted the Retrofit Robo-dog in mapping, localization, and navigation. Three main control components were set inside the robot body: a battery pack, an Nvidia Jetson Xavier NX single-board computer, and Intel NUC mini PC. The Nvidia Jetson was responsible for the sensor data collection, feedback processing, attitude estimation and simple visual obstacle avoidance. The Intel NUC handled more complex program computation, such as map generation, path planning, robot-environment interaction and communication. A projector-based augmented reality (PAR) module was installed on the back of the robot dog to project the defect points on the construction wall. The PAR module includes a compact projector and Intel Realsense T265 camera. A T265 camera as visual input for high-precision visual odometry and a projector as image output from Intel NUC.

In addition, the robot dog also had a remote controller and a simple control app for manually remote control.

On-board Defect Navigation Systems: Before the entire system is started, a start-point may be selected in both the real-world building and its digital twin model (BIM). After the system turns on, Retrofit Robo-Dog starts an automatic calibration progress. During this process, Retrofit Robo-Dog will randomly walk around in the room. Retrofit Robo-Dog can automatically locate its position in the room through the Lidar perception and align its internal digital twin model with the real world. If the defect point was already marked in the model through other systems, Retrofit Robo-Dog can use the A-Star algorithm to plan the shortest path to the defect point area. Based on the projector pose from T265 IMU, the Retrofit Robo-dog's systems will calculate properly transformed defect images from the digital twin model so they can be visualized by the projector onto the surfaces where retrofits are needed.

EASEEbot Workflow

Inspectors may use the EASEEbot UAS to help survey building envelopes during their visits to their project building sites. At a high level, there are three stages of a UAS building inspection site visit, and each stage has rules to follow, tasks to be performed for setting up the UAS and data collection, and expected outcomes for the inspector on their building project. All steps carried out by the inspector can also be carried out by EASEEbot staff who are trained in drone flight. After the inspection stage, engineers and retrofit workers can be guided by the EASEEbot Robo-Dog to aid in building envelope retrofitting.

Pre-Site Visit: Before initiating any UAS activities, inspectors may need to adhere to specific rules, and regulations. Commercial and industrial use of UASs weighing less than 55 pounds is designated as a small UAS-rated activity. These regulations are governed by the Federal Aviation Administration (FAA) under Federal Aviation Regulations, called FARs, as a part of Title 14 of the Code of Federal Regulations (CFR), also known as the CFR Part 107. It serves as a guideline for operating UASs, obtaining pilot and device certifications.

A building inspector may have a remote pilot certificate with a small UAS rating, as required under Part 107. A Remote Pilot in Command (RPIC) is the person who has the final authority and responsibility for the whole operation and safety of the UAS, including the people holding remote pilot licenses. To control a UAS, an inspector may hold a remote pilot certificate or be under the supervision of an RPIC. Additionally, an inspector may register the UAS covered under Part 107 and label the UAS with the registration number before operating it.

In the present disclosure, a building inspector may sometimes be referred to as a UAS operator.

Air traffic control (ATC) permission may be obtained for operations in Class B, C, D, and E airspaces, while operations in Class G airspace may not require such approval. Even if a building is located in those special airspaces, UAS operators can get FAA flight approval immediately by using a mobile application unless there is an extraordinary situation.

Prior to the site visit, the inspector may also plan a general flight path for the UAS around the whole or part of the building's envelope. The general flight path will depend on a number of different factors, including objectives of the inspector's project, areas of interest on the building envelope, notable obstacles around their project's building, and the particular phase of the project (see previous section on Use Cases). The inspector can consult building site plans, maps, and other resources offsite to help them plan the flight path. Inspectors may also consult the standard practices for data collection using all possible sensors attached to EASEEbot's UAS (e.g., 3D point cloud, infrared, GPR), to capture quality data from a proper distance to align with the expected outcomes determined before a flight. The UAS in both Flight Mode and Wall Climber mode may be considered. For Flight Mode's RGB color and infrared image data collection, our current estimation of the best capturing distance is from the building in the range from 8 ft-15 ft based on sensor-related standards such as camera distances, sensor sensitivity, and product specifications. For the GPR used during Wall Climb Mode, it may be beneficial to maintain the sensor close to the wall during its scan. This is to limit the interference associated with any air gap between the GPR module and the wall. In the pre-site visit stage, EASEEbot staff can assist with planning a flight path, provide additional flight training, or offer company-operated flight services to inspectors as needed.

During Site Visit: On-site, at least two people may be present: an RPIC and a Visual Observer (VO). The RPIC is tasked with ensuring safety and has the final authority and responsibility for the whole process, while the Visual Observer assists the RPIC or the person who controls the UAS. A Visual Observer may be required if RPIC is the one who operates the controls, and they need to keep the UAS in line of sight at all times to avoid other objects in the air or the ground within unaided sight. While the FAA allows for UAS flight over large groups of people, it is not recommended and may figure into the inspector's flight plan. While inspectors will plan a general flight path before a site visit, there are many unforeseen factors that may influence the capturing process and will require flight path revisions, such as site and weather conditions, natural surroundings, and public gatherings.

During data collection Flight Mode, the inspector may modify and control the UAS based on the quality of data being recorded by the UAS sensors. A built-in preview screen on the UAS controller will provide live visual feedback on the quality of RGB color and infrared data captured for flight adjustments.

While the inspector should expect thermal data collected to indicate moisture presence in the building envelope, there may still be instances where that thermal data is inconclusive. In those instances the inspector will switch the UAS from flight mode to wall climber mode. The inspector will attach the radar module to the UAS, enable wall climbing mode, and head up to the roof of a building. The wall climber inspection is a top down line scan of a building's façade in a specific location. The attached tether serves as a back up safety system, while the wheeled wall climbing robot is able to perform its scanning duties independent of the attached tether. Inspectors will guide the wall climber and when finished extract the scan and transfer it to our servers.

Post Site Visit: The RGB color, infrared, and GPR data captured by the UAS will require respective specialized methods to process into interpretable information for the inspector.

Returning from the building site, the inspector hands off hard drives with collected data to EASEEbot staff, who then process the data for AI-based analysis and visualization. EASEEbot's 3D reconstruction algorithm returns a multi-layered 3D model with geo-located color, infrared, GPR-grayscale scan images. EASEEbot's AI-based image analysis algorithms will also add annotation layers identifying specific defects as image masks on infrared and GPR scans.

EASEEbot's in-house Quality Assurance (QA) and Quality Control (QC) engineers in the team will review the AI-generated 3D models and annotation image masks to make sure overall geometry is consistent with the real building's and that generated masks are providing accurate defect identifications. If generated masks do not return a satisfactory result, QA/QC engineers will manually annotate that image to have a specific set of masks. In this way, the annotated image data returned to the inspector will have the correct masks while QA/QC continue to improve the AI-based image analysis algorithm. With correct masks on all images, and all images located on the building envelope's 3D geometry, the final output of EASEEbot staff's data processing will be a 3D point cloud model with color-coded data layers (RGB color, infrared, energy-related defects, moisture defects, etc.) that the inspector can view and visually customize for their inspection reports. Colors for identified defects will be specially colored (i.e., neon pink) to visually "pop" out over typical building colors. The visualization platform will be based on open source state-of-the-art web-based point cloud viewing platforms.

Benefits for Building Inspectors: EASEEbot offers fast and effective solutions for building envelope inspections, making it feasible to perform inspections on a large scale.

It is estimated that a UAS operator can collect data for a building with 90,000 SF of exterior surface area within 1.5 hours. For comparison, supported and suspended scaffolding needed for typical building envelope inspections can take 24 hours to 48 hours for an assembly crew just to set up. Furthermore, scaffolding, boom truck, and rope access operations require permits that take significant time to procure. With respect to building tenants and the public areas around the building, scaffolding efforts can disrupt building occupancy, traffic, and pedestrian activities. With a UAS, only an FAA flight approval is required for special airspaces and is quick to procure. The time needed for training, and certification is approximately 12 hours, similar to that required by other inspection-related certifications. The EASEEbot UAS is ground operable, eliminating the risks associated with inspections at heights and other dangerous areas. Even with fall protection safety training, inspectors will face considerable risks on conventional scaffolding and rope access. The drone is non-invasive and may be acoustically undetectable at a distance of 50 feet in an urban environment. An 8 story building with a 150'×300' footprint can be fully scanned in under 45 minutes and an AI analysis can be performed in 6 hours depending on available GPU resources. Users can be UAS trained for urban operations and FAA licensed in under 2 weeks at a cost of $300 USD. The thermal AI is particularly useful for tall buildings with large overhangs.

With previous technologies, thermally undetectable moisture issues often require destructive testing to find. At height, this requires a significant capital expenditure on infrastructure like scaffolding and boom trucks. For firms that perform at least one such inspection per month, the annual costs exceed $100,000. In addition to equipment costs, destructive testing inspectors are on site longer and spend more time creating the report deliverable; if a wall assembly is to be opened, it makes sense to run more tests and perform additional exploration and diagnosis. In contrast, EASEEbot's GPR detection may cost inspectors less than $3250 per month to use on unlimited buildings and scans. Scan quality is affected by the material being scanned. Bricks can be tougher to evaluate due to the heterogeneous nature of masonry construction. EIFS systems are much easier to evaluate because building materials tend to be more homogeneous. The GPR is unable to scan behind metal panels; metal is a total reflector of GPR signal at the radio frequencies used in GPR analysis. EASEEbot's AI analyzes the scan data to label anomalous areas. GPR has no adverse effects on building occupants and radar signal diminishes to the level of everyday radio noise after a few meters. Building owners will be less resistant to having their buildings checked for moisture. This may result in additional scans over the lifetime of the building. Workers will be able to evaluate areas more easily on historic buildings and significantly improve their time efficiency.

Thermal and RGB Image Fusion

Introduction to Thermal Cameras

Cameras capture light information based on the pinhole camera model. This model is based on the idea that light from a scene will pass through a small pinhole and produce an inverted image on the other side of the hole in a sufficiently dark space. This allows for the light from a scene to be captured without interference from other light sources. A smaller pinhole results in a crisper image; this limits the amount of light that can enter a space to just that of the scene, but the result is that less light enters the dark area behind the pinhole.

While this method of capturing light information is reliably able to capture and preserve the geometry of a scene, the smaller the hole, the less light can enter. To address this issue, lenses were added to capture more light from a scene and direct it through a pinhole aperture. The introduction of lenses allowed cameras to capture sharper images with a smaller exposure time, but lenses with manufacturing defects introduce distortions into an image. Over time, lens manufacturers have improved their industrial processes and they are able to produce lenses that have significantly less distortion than earlier models. Sometimes, it is necessary to produce a lens that creates distortions, such as in the case of fish eye lenses. These lenses capture more light and more information, but significantly distort the image, which is very useful in some applications.

Light information can be recorded through a number of methods. In the past, recording was done through the use of photographic film, which was a thin material that had photosensitive chemicals applied to it. This allowed one to capture a scene's light information; light would enter a pinhole, exit the pinhole and reproduce the scene in the darkened area where the film was stored. The photosensitive materials would react to the light and record the scene. This process was then digitized through the introduction of digital cameras. Digital cameras are able to capture the scene information by recording the light information at a specific pixel. Pixels in a digital camera are sensors that record the amount of energy that that sensor receives.

The above principles allow us to digitally record light information for light within the visible light spectrum, but the principles extend beyond the visible light spectrum to the thermal light/thermal electromagnetic radiation spectrum. Lenses made of germanium are able to capture and direct thermal light energy into an array of pixels able to record the radiometric energy received by them. While this information may be post-processed, it can either be stored as a JPG or an RJPG.

A JPG image is a standard image storage format. For visible light cameras, a JPG image is a three channel image with the pixels in each channel acting as a proxy for the amount of red, green, or blue light that was recorded by the pixel array. These pixel values are a proxy because in almost all cases, the actual amount of energy recorded by the pixels is not a required piece of information and the recorded information can be reduced to a value between 0 and 255. 0 representing that the sensor was completely un-activated, while 255 means that the sensor was fully activated. The benefits of storing images as a JPG are that they take up significantly less space than storing an array of actual energy values.

Unlike visible light images, thermal images are stored as one channel images. If a thermal image is stored as a JPG, image pixels will have a value from 0 to 255. Some information is lost, but this information may or may not be important to the person reviewing the image. Storing thermal images as an RJPG, or a radiometric JPG, means that we record the actual energy values that hit each pixel. Here no information is lost, but this comes at the cost of increased storage requirements. Increased storage requirements are only a concern for capturing video data, as 1 minute video recording at 30 frames per second will result in 1800 images. In industrial use cases, engineers carefully manipulate and adjust recording values associated with each RJPG to extract useful information out of the image. Some of the parameters that can affect an RJPG reading are atmospheric relative humidity, emissivity of the object being observed, and atmospheric temperature. Engineers manipulating RJPGs may know these values or control for them with educated assumptions. This information is critical when trying to understand the absolute temperature of an object. It is not as critical when trying to understand the shape and relative temperature of an object in relation to the other objects in the image. Oftentimes, it is useful to use a thermal JPG instead of a thermal RJPG because the most useful information is usually contained in the thermal JPG and the reduced storage requirements allow for videographic data instead of photographic.

In summary, it is possible to apply the pinhole camera model to thermal cameras. A lens made of germanium or another thermal transparent material is used to increase the amount of thermal electromagnetic radiation entering a thermal camera. The distortions produced due to the presence of the lens may be accounted for in order to an accurate image of the scene. Sensors record the amount of thermal energy they receive and these produce an RJPG. The RJPG is converted into a JPG which can then be processed using traditional computer vision techniques.

Thermal Camera Geometric Calibration

Geometric calibration may be performed on thermal cameras as they often produce a distorted image. In regular manual viewing applications, it is not necessary to perform undistortion as we can usually understand the scene without performing any special operations. In computer vision applications, to ensure that the computer is able to recognize shapes that look consistent across multiple different camera types and in different parts of the image, we perform undistortion.

In order to ascertain the camera's intrinsic properties, such as focal length and location of principle axis, as well as the distortion coefficients, which are used to undistort a camera image, we may perform a camera calibration. Distortion affects different parts of the image differently. In fisheye lens distortion, the portion of the image at the edges are significantly more distorted than those near the center. Therefore it is necessary to ensure that information from all portions of an image is accounted for when calibrating a camera to calculate its distortion coefficients.

In order to learn the cameras calibration matrix and distortion coefficients, it is beneficial to have a scene with coordinates that are known to lie straight in the real world and then find those same coordinates after they have been captured in the image. There are multiple ways of accomplishing this. In RGB photos, the most popular way of doing this is through the use of a checkerboard or a chessboard.

The alternating light-dark pattern is used to find a common corner between the squares. Often, the OpenCV library is used to find the checkerboard points and perform camera calibration and undistortion based on the location of corners on screen.

There have been a number of successful attempts to geometrically calibrate a thermal camera. Ursine et al attempted to geometrically calibrate a thermal camera by creating a checkerboard calibration grid. This grid was constructed with a copper plate that had a painted checkerboard calibration pattern. The problem with such a set up is that multiple calibration rigs would be susceptible to a level of error based on the human painters skills. The process of making and manufacturing these calibration grids limits industrial reproducibility.

Shibata et al are able to ensure industrial reproducibility through the use of an offset grid. While they use a checkboard pattern and the size of the checkers can be ensured to be consistent within a level of machine error, the offset they introduce can result in poor calibration if a camera calibration image is taken at a somewhat large angle. Furthermore, Shibata et al recognize that it is difficult to produce thermal images of checkerboard patterns with a quality and contrast high enough for corner detection and camera calibration. They introduce a novel tone mapping technique to adaptively increase the contrast of their images. The drawback of their method is that they require active heating of their calibration grid this means that camera calibration can only be performed in labs with specific equipment. Producing their set-up is also labour intensive and cannot be easily shipped from one location to another.

Hou et al were able to achieve results similar to those achieved by Ursine et al. They used a cardboard with square tin foil cut outs to create an emissivity difference that could be create a checkerboard pattern in thermal images. They were able to find the corners in the checkerboard pattern, but they required lab scale conditions to calibrate their thermal camera. Additionally, the calibration kit they have is not robust enough for commercial applications and could easily be damaged in transportation.

Cardboard and Acrylic Calibration Board

Initial calibration experiments involved creating a calibration kit with a spatially offset calibration board and heating up protruding parts of the board to create an observable thermal difference between black and white checks in a thermal image. The calibration board was made of black acrylic laser cut squares glued on to a cardboard backing/substrate. Paper with a printed 6×8 checkerboard pattern was pasted onto the cardboard sheet and acrylic squares were glued onto the paper. Black sections of the paper were covered by acrylic squares. The cardboard of size 12.5 inches (317.5 mm)×11.5 inches (292.1 mm). Acrylic squares had a side length of 1.1 inches (27.94 mm) and the printed checkerboard pattern had checks of the same size.

Wood and Vinyl Calibration Board

This calibration board was created out of a wood board that was spray painted white using commonly available household paint and a vinyl substrate. The wood portion of the calibration board was made of a 300 mm×420 mm×3.175 mm thick wood board that was laser cut to have 40 mm squares. To ensure that that piece was still continuous, wood squares were connected to each other by an 0.1 mm connection. This connection was small enough that it could not be detected by an RGB corner detection algorithm, but large enough that it could keep the checks together and prevent them from falling out. Black vinyl backing was taped to the back of the wooden portion of the calibration kit.

Heating was done by placing the wooden side of the cardboard calibration board onto a warm surface (40° C. to 50° C.) to create a temperature differential between the surface of the substrate and the surface of the wood. Images were captured indoors in rooms at 23° C. to 25° C.

The drone was turned on and flown indoors to hover over the calibration test kit. The calibration board was placed on indoor carpeting to further cool off the vinyl if it had also been heated along with the wood portion. The drone was flown at a distance from and above the wooden calibration board. The images were captured over a span of 6 minutes. When the calibration kit had cooled off and there was no longer an easily perceptible thermal difference between the vinyl and the wood, the calibration board was reheated and additional images were taken.

Metal and Vinyl Calibration Board

The metal calibration board was made of a large metal board and vinyl. The metal was ⅜ inches (9.525 mm) thick and made of unpolished oxidized aluminum. Vinyl was cut using a Cricut Maker. The process of creating a metal Apriltag calibration board was performed as follows:

1. The vinyl was cut in a vinyl cutter (e.g., a Cricut Maker).
2. The vinyl was applied onto sticking transfer paper.
3. The adhesive backing on the vinyl was removed and the cut whitespaces of the AprilTag were removed by hand.
4. The vinyl laden transfer paper was placed over the metal substrate board.
5. The vinyl was applied so as to reduce the chance of any bubbles being captured under it.
6. The transfer paper was removed so that the vinyl would not come off the metal substrate.
7. If vinyl began to come off the substrate, that section of the vinyl was re-pressed by a roller until the vinyl was well adhered to the metal substrate.

The tests were conducted heated and unheated, indoors and outdoors. The first qualitative test was conducted the same way as the previous tests were, the calibration board was heated indoors on a warm surface to warm the vinyl up and produce a thermal differential between the vinyl and the metal substrate. This resulted in a strongly visible image. The drone was turned on and flown indoors to hover over the calibration board. The calibration board was placed on indoor carpeting and the drone was flown at a distance from and above the board. The images were captured over a span of 2 minutes and 36 seconds. As the heat wore off, the image became less visible, but was still observable. Noise in the metal portion of the thermal image became more apparent when the plate was unheated.

In order to calibrate the images, the pyAprilTag library was used to calculate the distortion coefficients and the camera calibration matrix of the two cameras. RGB images were too large and the size of the RGB images had to be reduced in order to accurately find the AprilTags. The Thermal images could be processed after performing an image color inversion.

The second test was conducted outdoors on an overcast day in mid-April 2022 with an unheated calibration board. The kit was placed on the ground such that it had an unobstructed view of the sky. The thermal energy that comes from the sky is the thermal energy that is emitted from space. This thermal energy is minimal as long as the sun is not directly reflecting on the calibration board. The clouds from the overcast day also helped to diffuse energy from the sun and reduce the effect it had on the calibration board. Raw captured images may have their color scheme inverted, but no sharpening or filtering was done otherwise.

Results and Discussion

Cardboard Calibration Kit

This calibration board was easily susceptible to uneven heating over various sections of the calibration board. The thermal images were put through a checker detection algorithm, but the image corners were not crisp enough to allow for easy detection. A number of image processing techniques were used to try to improve the contrast between the acrylic and the cardboard to allow for better checker corner detection.

Despite using various image processing techniques, it was not possible to get useful calibration information out of this technique. Although the acrylic squares were able to heat up evenly, the corner detection algorithm failed due to the uneven heating of the cardboard substrate. A better calibration kit was needed with a thinner substrate that would cool off more rapidly than the overlaid checker pattern.

Wood and Vinyl Calibration Board

This calibration board would cool off in under 6 minutes. In some thermal images, a checkerboard pattern could be detected without any additional image processing. However, because the checks were spatially raised, the corner detection algorithm had issues in detecting where the true corner actually was since the corner that would be picked up could be either the bottom corner or the top corner.

This resulted in a subpar calibration and the calibration results were unusable unless the thermal camera was far enough away that the spatial difference between the top corner and the bottom corner was imperceptibly small in thermal images. This however, resulted in excessive blur and meant that the corner detection algorithm would not work effectively. This experiment showed that the calibration surface needed to be planar, the calibration images needed to be captured on a passively heated calibration board to ensure that we could capture a large number of calibration images, and that the detected corners/feature points needed to be accurate to ensure an precise alignment of RGB and thermal images.

Metal and Vinyl Calibration Board

Due to the calibration board being passively heated and due to orienting the calibration board towards the sky, the image was consistent regardless of how much time passed between the first image capture and the last image capture. This meant that this calibration could be conducted cheaply and easily anywhere there was an open field or an area without many obstructions nearby. The vinyl AprilTags on a metal substrate made capture of calibration feature points significantly more robust. This solved a number of problems: the problem of calibration feature points were no longer being captured at different elevations; the stark contrast between the high emissivity vinyl and the low emissivity metal substrate meant that a large and clear image contrast could be achieved by capturing the calibration board outdoors in an open area; the AprilTags helped ensure that captured points were even more robust and created a way of finding common points in both the RGB and thermal images. Not all Apriltags could be detected in thermal and RGB images. Some pictures had a 0 detection rate, some picture were able to detect all detectable AprilTags. Two AprilTags were consistently undetectable due to holes in the metal board. These were not used in analysis.

Thermal and RGB Image Alignment

Thermal and RGB images capture different kinds of information, but thermal and RGB cameras can be described with the same pinhole camera model. It is possible to combine RGB and thermal information to create a four channel RGBT tensor that shows spatially correlated color and thermal scene information. In this case, the motivation to do so is based on creating building envelope datasets to perform deep learning on. Thermal and RGB image data fusion is complicated by a number of factors including different fields of view and difficulty finding common registration points. In general, unmanned aerial vehicles (UAVs) reduce the complexity of this problem because RGB and thermal cameras are generally fixed relative to each other and capture images at approximately the same time.

There have a number of successful attempts to combine and register thermal and RGB images. Istenic et al used a Hough transform to register thermal and RGB images. They required a structured environment with many lines and were not able to accurately account for scale between images in all cases. Kynaz and Moshkantsev developed a technique that created a 3D scene using RGB and thermal information and combined the two 3D scenes to find the transforms between associated RGB and thermal images. Dlesk et al researched the use of homography to align images with detectable feature points and went on to perform experiments that create RGBT imagery through combining RGT, RBT and RTB imagery.

Methods and Results

AprilTag Detection after Image Reduction

Images were first undistorted using the distortion coefficients and the calibration matrix obtained in the previous step.

$$\text{Distortion Coefficients} = [k_1 \quad k_2 \quad p_1 \quad p_2 \quad k_3]$$

$$x_{undst} = x(1 + k_1 r^2 + k_2 r^4 + k_3 r^6) + p_1(r^2 + 2x^2) + 2p_2 xy$$

$$y_{undst} = y(1 + k_1 r^2 + k_2 r^4 + k_3 r^6) + 2p_1 xy + p_2(r^2 + 2y^2)$$

$$\text{Camera Intrinsics Matrix} = \begin{bmatrix} f_x & 0 & c_x \\ 0 & f_y & c_y \\ 0 & 0 & 1 \end{bmatrix}$$

Once images were undistorted, an RGB and thermal image pair was created from the RGB and thermal images taken at the same time of the same scene.

$$\text{Image Pair} = (RGB_i, Th_i)$$

Each image in the image pair was individually run through the AprilTag detection algorithm to create two sets of detected tag coordinates TC.

$$f(RGB_i) = \{TC_{i,1} TC_{i,2} TC_{i,4} TC_{i,6} \ldots TC_{i,n}\} = \mathbb{S}_{RGB}$$

$$f(Th_i) = \{TC_{i,1} TC_{i,2} TC_{i,3} TC_{i,4} \ldots TC_{i,n}\} = \mathbb{S}_{Th}$$

The intersection of the two sets of detected tag coordinates creates a new set of tag coordinate pairs.

$$\mathbb{S}_{RGB} \cap \mathbb{S}_{Th} = \mathbb{S}_{TCP} = \{(TC_{i,1}^{RGB}, TC_{i,1}^{Th})(TC_{i,2}^{RGB}, TC_{i,2}^{Th}) \cdots (TC_{i,n}^{RGB}, TC_{i,n}^{Th})\}$$

Each of the Euclidean coordinate pairs is then homogenized into a vector of homogeneous coordinates.

$$C_{i,n,m}^X = \begin{bmatrix} x \\ y \end{bmatrix} = \begin{bmatrix} x \\ y \\ 1 \end{bmatrix}$$

At this point, all the coordinates in an image pair could be normalized and all of the detected coordinates in an image of an image pair could be represented as a coordinate matrix:

$$(RGB_i, Th_i) \rightarrow \left( C_i^{RGB}, C_i^{Th} \right)$$

The first normalization step is centralization—all coordinates are translated such that they are all collectively centered around the origin.

$$CC_i^{RGB} = T^{RGB} \cdot C_i^{RGB}$$
$$CC_i^{Th} = T^{Th} \cdot C_i^{Th}$$

The second normalization step is scaling to reduce the average distance from the origin of all centralized points to 1.

$$\tilde{C}_i^{RGB} = S^{RGB} \cdot CC_i^{RGB} = S^{RGB} \cdot T^{RGB} \cdot C_i^{RGB}$$
$$\tilde{C}_i^{Th} = S^{Th} \cdot CC_i^{Th} = S^{Th} \cdot T^{Th} \cdot C_i^{Th}$$

The normalized points can now be used to assemble an A matrix that will be used to solve a homogeneous linear least squares problem, $A_x = 0$.

$$g(\text{ImagePairs}) \rightarrow A$$

After assembling the complete A matrix, singular value decomposition can be used to calculate the homography from normalized RGB image AprilTag coordinates to normalized thermal image AprilTag coordinates.

$$A = U\Sigma V^T$$

The right most column of V can be reshaped into a 3×3 $\tilde{H}$ matrix that is the homography matrix between normalized coordinates. In order to establish a baseline level of error for this algorithm, the tag coordinates in the RGB image were transformed in to tag coordinates in the thermal image using the following algorithm:

$$C_i^{Th,RGB} = T^{Th-1} \cdot S^{Th-1} \cdot \tilde{H} \cdot S^{RGB} \cdot T^{RGB} \cdot C_i^{RGB}$$

This could also be represented by the general homography from RGB to thermal images:

$$H = T^{Th-1} \cdot S^{Th-1} \cdot \tilde{H} \cdot S^{RGB} \cdot T^{RGB}$$

The X, Y, and overall reprojection error between the thermal image and the transformed RGB image were calculated and compared. The thermal images were taken as the ground truth. In some cases, RGB images may be resized smaller in order for the AprilTags to be detected. This analysis was carried out on RGB images that were resized to be 90% to 10% of the original size in 5% increments. This was done to maximize the number of AprilTags detected and increase the accuracy of the homography between the image pairs.

This general homography could now be applied to overlap an RGB image and a thermal image given a set of corresponding points seen in both images. However, thermal and RGB images often do not share enough features to allow for making correspondences. The differently sized thermal and RGB images meant that a different general homography may be used to transform RGB images to thermal images for data fusion.

Homography Calculation

Although a different general homography may be used, the normalized homography between all images remained the same. The field of view of the RGB camera was larger than the thermal camera and so there was a portion of the RGB image that would consistently cross over the portion of the thermal image. In order to calculate the general homography for images between the two cameras, new normalization transforms were calculated. These transforms would not normalize AprilTags corners and centers or some other features observable within both images in an image pair. These would utilize the following general normalization transforms:

$$T_G^{Th}$$

$\rightarrow$General centralizing normalization matrix for thermal images $$T_G^{RGB}$$

$\rightarrow$General centralizing normalization matrix for RGB images $$S_G^{TH}$$

$\rightarrow$General scaling normalization matrix for thermal images $$S_G^{RGB}$$

$\rightarrow$General scaling normalization matrix for RGB images

These thermal image transformations would normalize the thermal image corners and the corresponding points in the RGB image. The normalization points in the thermal image are defined to be based on the image size.

$$NC_G^{Th} = \begin{bmatrix} 0 & 0 \\ 0 & \text{Height}(Th_i) \\ \text{Width}(Th_i) & 0 \\ \text{Width}(Th_i) & \text{Height}(Th_i) \end{bmatrix}$$

However, the normalization points within the RGB image are not precisely known.

$$T_G^{Th}, T_G^{RGB}, \text{ and } S_G^{Th}$$

can be directly calculated from the size of the RGB and thermal image by using the RGB and thermal image corners.

However, because we do not know the precise corresponding normalization points within the RGB image we cannot directly calculate the $$S_G^{RGB}.$$

Instead we uses a Hadamard quotient to relate the $$S_G^{RGB} \text{ and } S_G^{Th}.$$

In the previous normalization step, the RGB and thermal images in each image pair were normalized by the scaling normalization matrices $$S_i^{RGB} \text{ and } S_i^{Th}$$

that were unique to the images in each image pair. The Hadamard quotient, or the element wise division, of these two matrices results in a relative scaling matrix that related the level of normalization scaling performed for the RGB and thermal images.

$$S_i^{RGB} \oslash S_i^{Th} = S_i^{HMD}$$

Given a set of image pairs with corresponding feature points, we could extract a set of scaling normalization matrices for each image pair and this would allow us to obtain a set of Hadamard quotients between the scaling normalization matrices.

$$\{RGB_i, Th_i\} \rightarrow \{S_i^{RGB}, S_i^{Th}\} \rightarrow \{S_i^{HMD}\}$$

The set of Hadamard quotients could be averaged to produce a general Hadamard quotient.

$$S_G^{HMD} = \frac{1}{n}\sum_{i=1}^{n} S_i^{HMD}$$

The general Hadamard quotient and the general scaling normalization matrix for thermal images could be used to generate a pseudo general scaling normalization matrix for RGB images.

$$S_G'^{RGB} = S_G^{HMD} \odot S_G^{Th}$$

With $$S_G'^{RGB},$$

a new general homography could be calculated to transform all RGB images to the thermal image space so that they could be merged into 4 channel RGBT tensors.

$$H_G = T_G^{Th-1} \cdot S_G^{Th-1} \cdot \tilde{H} \cdot S_G'^{RGB} \cdot T_G^{RGB}$$

This general transformation homography was applied to all the RGB images in the set of RGB and thermal image pairs to produce a new set of warped RGB image and thermal image pairs.

$$H_G(RGB_i, Th_i)$$

An AprilTag detection algorithm was used on every image in the new set of image pairs to detect AprilTag corners and center pixel locations. The detected points in the thermal images were used as the ground truth to assess the detected points in the RGB images. The following graph shows the pixel errors seen for all detected points in the image pair dataset.

DISCUSSION AND CONCLUSION

AprilTag Detection after Image Registration

This experiment showed that the highest resolution RGB image within which the largest number of AprilTag points could be detected was one that was reduced to 50% of the original size. Baseline image registration accuracy improved as RGB images were downsized to 80%, or until there were 5500 different feature point pairs that could be used to calculate $\tilde{H}$. After that, image registration error remained fairly constant, but the number of detected feature point pairs increased to the maximum of just under 8000 different feature point pairs. Although this did not improve the image registration accuracy, it does ensure that outliers have less of an effect on the calculated $\tilde{H}$. This experiment also established a baseline level of error to expect with this method. This method is an approximation based on the assumption that the two cameras are positioned relatively closely and the image that they are viewing is relatively far away. This assumption generally holds true for UAV mounted systems that simultaneously capture thermal and RGB imagery. Furthermore this experiment showed that thermal cameras can be calibrated robustly using vinyl AprilTags and metal plates. Sky facing plates with AprilTags and vinyl can be used to create common feature points within RGB and thermal images taken of the same scene.

If the general homography transform results in subpar image registration, these robust metal plates can be distributed around a building to improve the algorithms image registration.

Homography Calculation

Figure 25:
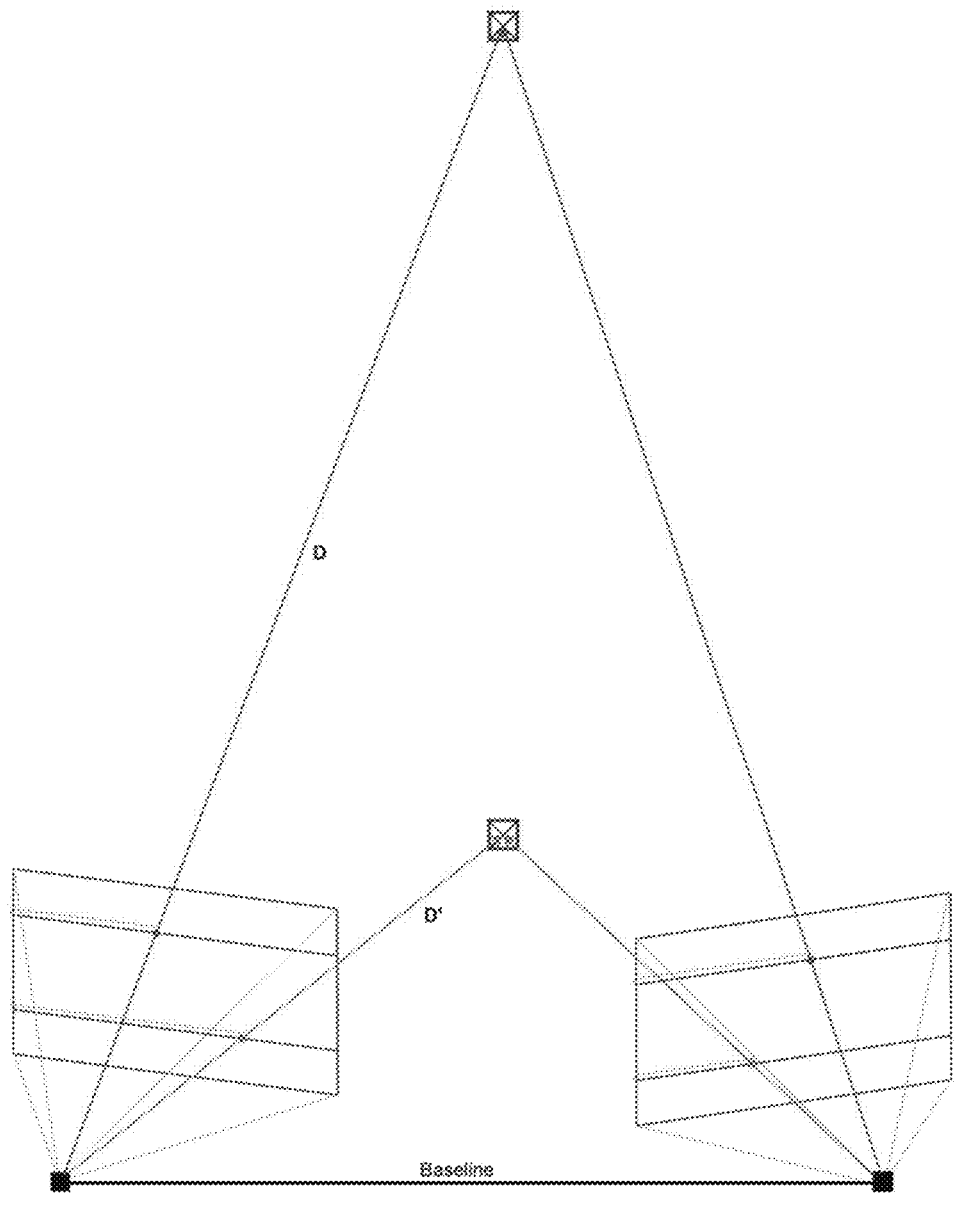
FIG. 25: The effect of near depth objects on image registration via the homography approximation method.

This experiment showed that thermal and RGB images could be aligned despite difference in distortion and field of view between cameras. Scene that were closer to the camera had more of an issue with alignment. This is because as the distance between the 3D location of the AprilTags and the cameras, $(X^{Th}, X^{RGB})$, increases, the ratio between the distance between the 3D location of the AprilTags and the cameras and the baseline distance between the two cameras gets progressively smaller and begins to approach 0. Therefore the angle between the two cameras and the world point changes less even as the depth of the world point increases in depth. FIG. 25 shows how the 3D to 2D projection of a world point on to the camera image plane changes significantly based on the distance of the world point to the cameras and the baseline distance between the cameras.

In general, the image registration algorithm had a pixel error of ±5 pixels in the y direction and ±2 pixels in the x direction. The image registration algorithm could be further improved by having a better $$S_G^{HMD}$$

estimation. This estimation can be improved by using RANSAC to filter out images that required an $$S_G^{HMD}$$

that was significantly different from other images. These images are fairly well aligned and this algorithm can be used to create custom datasets from captured thermal and RGB imagery of building envelopes.

Although the present disclosure has been described with respect to one or more particular embodiments, it will be understood that other embodiments of the present disclosure may be made without departing from the spirit and scope of the present disclosure.

What is claimed is:

1. An inspection system, comprising:
a ground penetrating radar (GPR) sensor configured to provide at least one probe signal to a portion of a structure and to receive at least one return signal resulting from the corresponding at least one probe signal; and
a processor in electronic communication with the GPR sensor, wherein the processor is programmed to:
receive the at least one return signal and combine two or more return signals as scan data from the GPR sensor;
generate maximum amplitude trace normalized data based on the scan data;
generate temporal signal gain data based on the scan data;
generate a power spectral density image for each of the scan data, the maximum amplitude trace normalized data, and the temporal signal gain data; and
analyze, using a machine learning processor, the power spectral density images to identify an anomaly of interest, wherein the machine learning processor is trained to detect an anomaly of interest based on a training set of power spectral density images; and
generate a map based on the identified anomaly of interest.

2. The inspection system of claim 1, wherein the anomaly of interest is moisture.

3. The inspection system of claim 2, wherein the processor is further programmed to label moisture in a map generated by a mapping circuit based on the identified moisture.

4. The inspection system of claim 1, wherein the machine learning processor is an artificial neural network (ANN).

5. The inspection system of claim 4, wherein the ANN is a convolutional neural network.

6. The inspection system of claim 1, wherein the at least one probe signal is a pulsed signal.

7. The inspection system of claim 1, wherein the at least one probe signal is a continuous signal.

8. The inspection system of claim 1, further comprising a localization circuit, a mapping circuit, or a simultaneous localization and mapping (SLAM) sensor.

9. The inspection system of claim 8, wherein the processor is further configured to receive localization information, mapping information, or both, corresponding to the scan data.

10. The inspection system of claim 8, further comprising a robotic platform to which the GPR sensor is affixed, the robotic platform configured to move over a surface.

11. The inspection system of claim 1, wherein the processor is further programmed to concatenate the power spectral density images into a 2-dimensional image before analysis using the machine learning processor.

12. The inspection system of claim 1, wherein the processor is further programmed to register the two or more return signals into a same coordinate frame.

13. A method of inspecting a structure, the method comprising:
receiving scan data of a structure from a GPR sensor;
generating maximum amplitude trace normalized data based on the scan data;
generating temporal signal gain data based on the scan data;
generating a power spectral density image for each of the scan data, the maximum amplitude trace normalized data, and the temporal signal gain data; and
analyzing, using a machine learning processor, the power spectral density images to identify an anomaly of interest, wherein the machine learning processor is trained to detect an anomaly of interest based on a training set of power spectral density images; and
generating a map based on the identified anomaly of interest.

14. The method of claim 13, wherein the anomaly of interest is moisture.

15. The method of claim 14, further comprising labeling moisture in a map of the structure based on the identified moisture.

16. The method of claim 13, wherein the machine learning processor is an artificial neural network (ANN).

17. The method of claim 16, wherein the ANN is a convolutional neural network.

18. The method of claim 13, further comprising receiving localization information, mapping information, or both, corresponding to the scan data.

19. The method of claim 13, further comprising concatenating the power spectral density images before analysis using the machine learning processor.

* * * * *